US012671907B2

(12) United States Patent　(10) Patent No.: US 12,671,907 B2
Cui　(45) Date of Patent: Jun. 30, 2026

(54) VIDEO PROCESSING METHOD AND ELECTRONIC DEVICE

(71) Applicant: Honor Device Co., Ltd., Shenzhen (CN)

(72) Inventor: Hantao Cui, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 32 days.

(21) Appl. No.: 18/833,778

(22) PCT Filed: Apr. 26, 2023

(86) PCT No.: PCT/CN2023/090835
§ 371 (c)(1),
(2) Date: Jul. 26, 2024

(87) PCT Pub. No.: WO2024/032033
PCT Pub. Date: Feb. 15, 2024

(65) Prior Publication Data
US 2025/0106525 A1 Mar. 27, 2025

(30) Foreign Application Priority Data
Aug. 9, 2022 (CN) .......................... 202210950356.6

(51) Int. Cl.
*H04N 23/73* (2023.01)
*G06T 5/50* (2006.01)
(Continued)

(52) U.S. Cl.
CPC .............. *H04N 23/73* (2023.01); *G06T 5/50* (2013.01); *G06V 10/60* (2022.01); *H04N 23/741* (2023.01);
(Continued)

(58) Field of Classification Search
CPC .... H04N 23/73; H04N 23/741; H04N 23/745; H04N 23/667; H04N 23/71;
(Continued)

(56) References Cited

U.S. PATENT DOCUMENTS 10,447,942 B1 * 10/2019 Shaick ................... H04N 23/80
10,834,400 B1 11/2020 Topiwala et al.
(Continued)

FOREIGN PATENT DOCUMENTS

CN 103516984 A 1/2014
CN 104144305 A 11/2014
(Continued)

*Primary Examiner* — Mekonnen D Dagnew
(74) *Attorney, Agent, or Firm* — Slater Matsil, LLP

(57) ABSTRACT

This application provides a video processing method and an electronic device, and pertains to the field of terminal technologies. The method includes: receiving a first operation input by a user; obtaining a first image in a preset default high-dynamic range HDR exposure manner in response to the first operation; obtaining ambient brightness based on the first image, and determining a target HDR exposure manner based on a preset policy, where the preset policy includes a dynamic range corresponding to video shooting, a flicker status, and a correspondence between the ambient brightness and the target HDR exposure manner; and when the target HDR exposure manner is different from the default HDR exposure manner, switching the default HDR exposure manner to the target HDR exposure manner, and continuing to perform the video shooting.

20 Claims, 18 Drawing Sheets

Stagger HDR

(51) Int. Cl.
*G06V 10/60* (2022.01)
*H04N 23/741* (2023.01)
*H04N 23/745* (2023.01)

(52) U.S. Cl.
CPC . *H04N 23/745* (2023.01); *G06T 2207/10144*
(2013.01); *G06T 2207/20208* (2013.01); *G06T*
*2207/20221* (2013.01)

(58) Field of Classification Search
CPC ...... H04N 23/743; H04N 23/76; H04N 25/42;
H04N 25/46; H04N 25/58; H04N 25/583;
H04N 25/587; G06T 5/50; G06T
2207/10144; G06T 2207/20208; G06T
2207/20221; G06V 10/60
See application file for complete search history.

(56) References Cited

U.S. PATENT DOCUMENTS

| | | |
|---|---|---|
| 11,671,715 B2 | 6/2023 | Liu et al. |
| 2009/0086074 A1 | 4/2009 | Li et al. |

| | | | |
|---|---|---|---|
| 2014/0307117 A1 | 10/2014 | Feng et al. | |
| 2018/0302578 A1* | 10/2018 | Ebihara | H04N 25/78 |
| 2020/0045219 A1 | 2/2020 | Zhang | |
| 2022/0377228 A1* | 11/2022 | Lim | H04N 23/72 |
| 2023/0222786 A1* | 7/2023 | Litzau | G08G 5/21 |
| | | | 382/104 |
| 2023/0276136 A1 | 8/2023 | Cui et al. | |
| 2023/0300478 A1* | 9/2023 | Bohannon | H04N 25/51 |

FOREIGN PATENT DOCUMENTS

| | | |
|---|---|---|
| CN | 112449120 A | 3/2021 |
| CN | 112616013 A | 4/2021 |
| CN | 112738414 A | 4/2021 |
| CN | 113572948 A | 10/2021 |
| CN | 114157791 A | 3/2022 |
| CN | 114466134 A | 5/2022 |
| CN | 114513610 A | 5/2022 |
| CN | 114785966 A | 7/2022 |
| WO | 2022154931 A1 | 7/2022 |

* cited by examiner

SHDR

L    S

Binning

DCG

HCG

LCG

DAG

HAG

LAG

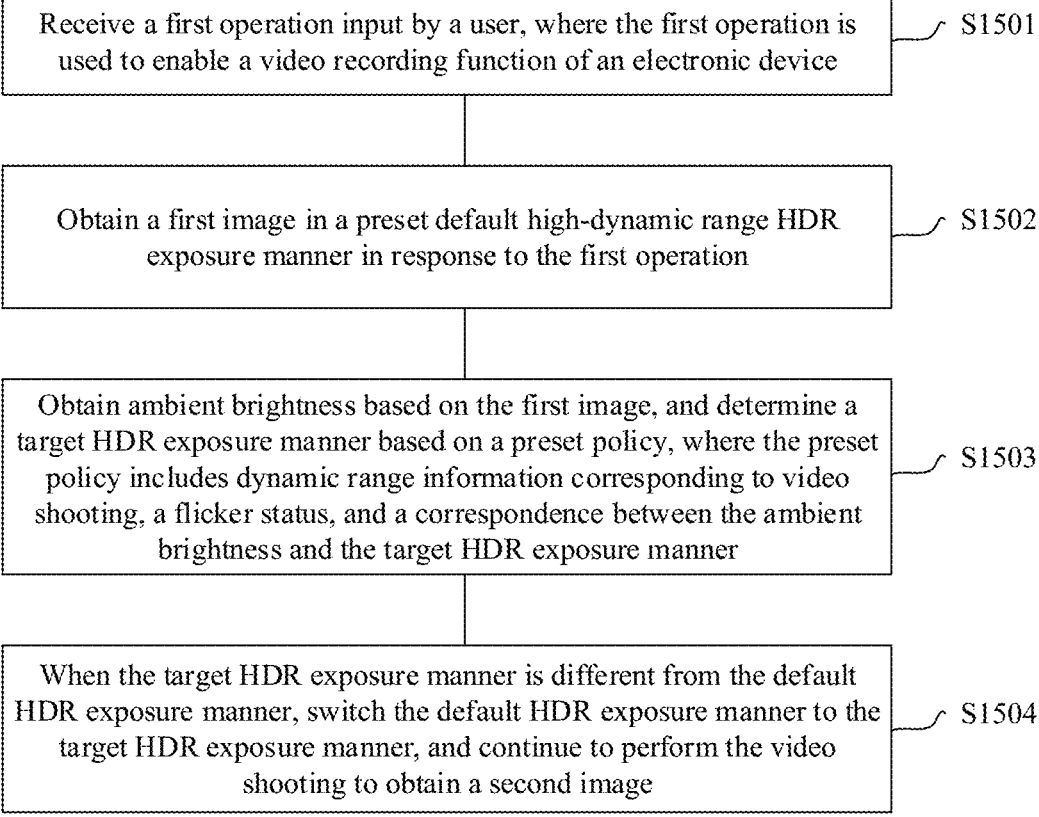

Receive a first operation input by a user, where the first operation is used to enable a video recording function of an electronic device     S1501

Obtain a first image in a preset default high-dynamic range HDR exposure manner in response to the first operation     S1502

Obtain ambient brightness based on the first image, and determine a target HDR exposure manner based on a preset policy, where the preset policy includes dynamic range information corresponding to video shooting, a flicker status, and a correspondence between the ambient brightness and the target HDR exposure manner     S1503

When the target HDR exposure manner is different from the default HDR exposure manner, switch the default HDR exposure manner to the target HDR exposure manner, and continue to perform the video shooting to obtain a second image     S1504

FIG. 15

VIDEO PROCESSING METHOD AND ELECTRONIC DEVICE

CROSS-REFERENCE TO RELATED APPLICATIONS

This application is a National Stage of International Applica tion No. PCT/CN2023/090835, filed on Apr. 26, 2023, which claims priority to Chinese Patent Application No. 202210950356.6, filed on Aug. 9, 2022, both of which are hereby incorporated by reference in their entireties.

TECHNICAL FIELD

This application relates to the field of terminal technologies, and in particular, to a video processing method and an electronic device.

BACKGROUND

Exposure is a process in which entering light from a lens is received by using a photosensitive device to form an image. In a shooting process, brightness intensity of a shooting background or a shooting theme changes. Excessively strong external light is prone to cause overexposure, and consequently an image is excessively bright and lacks layers and details; and excessively weak external light is prone to cause underexposure, and consequently an image is excessively dark and cannot reflect a real color.

In actual application, brightness of an image is usually limited by a dynamic range (dynamic imaging). The dynamic range is a ratio between a maximum output signal and a minimum output signal that are supported by a device, or a grayscale ratio between a brightness upper limit and a brightness lower limit that are of an image. If ambient brightness is greater than an upper limit value of the dynamic range, a shot image is relatively bright; or if the ambient brightness is less than a brightness lower limit value of the dynamic range, a shot image is relatively dark.

Currently, factors affecting the dynamic range include sizes of a device and an image sensor (camera sensor). When a sensor has a larger size, a photosensitive surface area is larger, more areas for receiving light information can be provided in exposure time, there are more pixels, and the dynamic range is larger. However, with the development of science and technology, miniaturization of physical space of a device limits a size of a sensor, resulting in a limited dynamic range.

SUMMARY

Embodiments of this application provide a video processing method, to perform seamless automatic switching between a plurality of exposure manners based on an actual video shooting situation, thereby implementing efficient HDR processing in a video shooting scenario and improving video picture quality.

According to a first aspect, a video processing method is provided and is applied to an electronic device. The method includes:

receiving a first operation input by a user, where the first operation is used to enable a video shooting function of the electronic device;

obtaining a first image in a preset default high-dynamic range HDR exposure manner in response to the first operation;

obtaining ambient brightness based on the first image, and determining a target HDR exposure manner based on a preset policy, where the preset policy includes dynamic range information corresponding to the video shooting, a flicker status, and a correspondence between the ambient brightness and the target HDR exposure manner; and when the target HDR exposure manner is different from the default HDR exposure manner, switching the default HDR exposure manner to the target HDR exposure manner, and continuing to perform the video shooting to obtain a second image.

In a possible implementation, the dynamic range information herein may include a dynamic range and/or a dynamic range compression gain.

According to the video processing method provided in this implementation, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

With reference to the first aspect, in some implementations of the first aspect, the target HDR exposure manner includes at least a first HDR exposure manner and a second HDR exposure manner, the first HDR exposure manner is a single-frame mode, and the second HDR exposure manner is a dual-frame mode; and images input in the dual-frame mode are fused when the target HDR exposure manner is the second HDR exposure manner.

In a possible implementation, the single-frame mode may be a Binning exposure manner. To be specific, an image sensor outputs a single-frame image after exposure. The dual-frame mode may be an exposure manner such as an SHDR, a DCG, or a DXG. To be specific, two frames of images are read based on one time of exposure, and then the two frames of images are fused to adjust an HDR manner; or two frames of images are obtained through long exposure and short exposure, and the two frames of images are fused to adjust an HDR manner.

With reference to the first aspect, in some implementations of the first aspect, the first HDR exposure manner is a Binning mode, the second HDR exposure manner includes a stagger high-dynamic range SHDR mode and a DXG, and the DXG is a mode in which a dual conversion gain DCG mode and a dual analog gain DAG are used in superposition.

With reference to the first aspect, in some implementations of the first aspect, the method further includes:

presetting a target parameter corresponding to an image obtained through the video shooting; and adjusting, to the target parameter, an initial parameter corresponding to the first image obtained in the first HDR exposure manner; and/or adjusting, to the target parameter, an initial parameter corresponding to the second image obtained in the second HDR exposure manner.

In a possible implementation, the target parameter herein may include an image size, a bit depth, and the like.

It should be understood that, parameters of images corresponding to different exposure manners are adjusted to the target parameter, so that images in different exposure manners have a same image parameter, to prevent an image jump when switching is performed between different exposure manners.

With reference to the first aspect, in some implementations of the first aspect, the electronic device includes an automatic exposure control AEC module, an image sensor, and a sensing module; and the obtaining a first image in a preset default HDR exposure manner in response to the first operation specifically includes:

the AEC module sends first indication information to the image sensor in response to the first operation, where the first indication information is used to indicate to capture an image in the default HDR exposure manner; and in response to the first indication information, the image sensor uses the default HDR exposure manner and obtains the first image.

With reference to the first aspect, in some implementations of the first aspect, the electronic device includes the AEC module, the image sensor, and the sensing module; and the obtaining ambient brightness based on the first image, and determining a target HDR exposure manner based on a preset policy specifically includes:

the image sensor sends the first image to the sensing module;

the sensing module obtains the ambient brightness based on the first image, and indicates the ambient brightness to the AEC module; and the AEC module determines the target HDR exposure manner based on the ambient brightness and the preset policy.

With reference to the first aspect, in some implementations of the first aspect, the electronic device includes the AEC module, the image sensor, the sensing module, and a fusion module; and that images input in the dual-frame mode are fused when the target HDR exposure manner is the second HDR exposure manner specifically includes:

when the target HDR exposure manner is the second HDR exposure manner, the image sensor transmits the images in the dual-frame mode to the fusion module; and the fusion module fuses the images in the dual-frame mode; or when the target HDR exposure manner is the second HDR exposure manner, the image sensor fuses the images in the dual-frame mode.

With reference to the first aspect, in some implementations of the first aspect, when fusing the images in the dual-frame mode, the fusion module separately determines a target photosensitivity ratio between a dual-frame input image in the DCG mode and a dual-frame input image in the DAG mode based on a photosensitivity ratio required in the DXG mode; and separately performs corresponding superposition on the dual-frame input image in the DCG mode and the dual-frame input image in the DAG mode based on the target photosensitivity ratio, to obtain a superposed dual-frame input image that meets the photosensitivity ratio in the DXG mode.

With reference to the first aspect, in some implementations of the first aspect, when fusing the images in the dual-frame mode, the image sensor superposes a dual-frame input image in the DCG mode and a dual-frame input image in the DAG mode based on a preset photosensitivity ratio.

With reference to the first aspect, in some implementations of the first aspect, the determining a target HDR exposure manner based on a preset policy specifically includes:

obtaining a dynamic range corresponding to the video shooting;

when the dynamic range information is less than a first threshold, determining that the target HDR exposure manner is the Binning mode;

when the dynamic range information is greater than or equal to the first threshold, detecting whether a flicker exists;

when the flicker exists, determining that the target HDR exposure manner is the Binning mode;

when no flicker exists, determining the target HDR exposure manner based on the ambient brightness;

when the ambient brightness is greater than a second threshold, determining that the target HDR exposure manner is the SHDR mode; and when the ambient brightness is less than a third threshold, determining that the target HDR exposure manner is the DXG mode.

With reference to the first aspect, in some implementations of the first aspect, the method further includes:

detecting whether a thermal escape phenomenon exists in the video shooting; and when the thermal escape phenomenon exists, determining that the target HDR exposure manner is the Binning mode.

With reference to the first aspect, in some implementations of the first aspect, the electronic device supports the first HDR video mode, and the first HDR video mode includes HDR10 or HDR10+.

With reference to the first aspect, in some implementations of the first aspect, when there is switching between an HDR camera and a non-HDR camera during the video shooting, the method further includes:

when an exposure manner of the HDR camera is the first HDR exposure manner and an exposure manner corresponding to the non-HDR camera is the second HDR exposure manner during the switching, adjusting a first dynamic range gain corresponding to the first HDR exposure manner, so that the first dynamic range gain is closest to a second dynamic range gain corresponding to the second HDR exposure manner.

With reference to the first aspect, in some implementations of the first aspect, the method further includes:

displaying a first interface, where the first interface includes a first control, and the first control is configured to enable a function of automatically switching the HDR exposure manner.

According to a second aspect, an electronic device is provided, including: one or more processors; and one or more memories. The one or more memories store one or more computer programs, and the one or more computer programs include instructions. When the instructions are executed by the one or more processors, the electronic device is enabled to perform the method according to any one of the implementations of the first aspect or the second aspect.

According to a third aspect, a computer-readable storage medium is provided. The computer-readable storage medium stores computer-executable program instructions. When the computer-executable program instructions are run on a computer, the computer is enabled to perform the method according to any one of the implementations of the first aspect or the second aspect.

According to a fourth aspect, a computer program product is provided. The computer program product includes computer program code. When the computer program code is run on a computer, the computer is enabled to perform the method according to any one of the implementations of the first aspect or the second aspect.

BRIEF DESCRIPTION OF THE DRAWINGS

FIG. 15 is a schematic diagram of still another video processing method according to an embodiment of this application.

DETAILED DESCRIPTION OF ILLUSTRATIVE EMBODIMENTS

Figures 1, 2A, 2B:
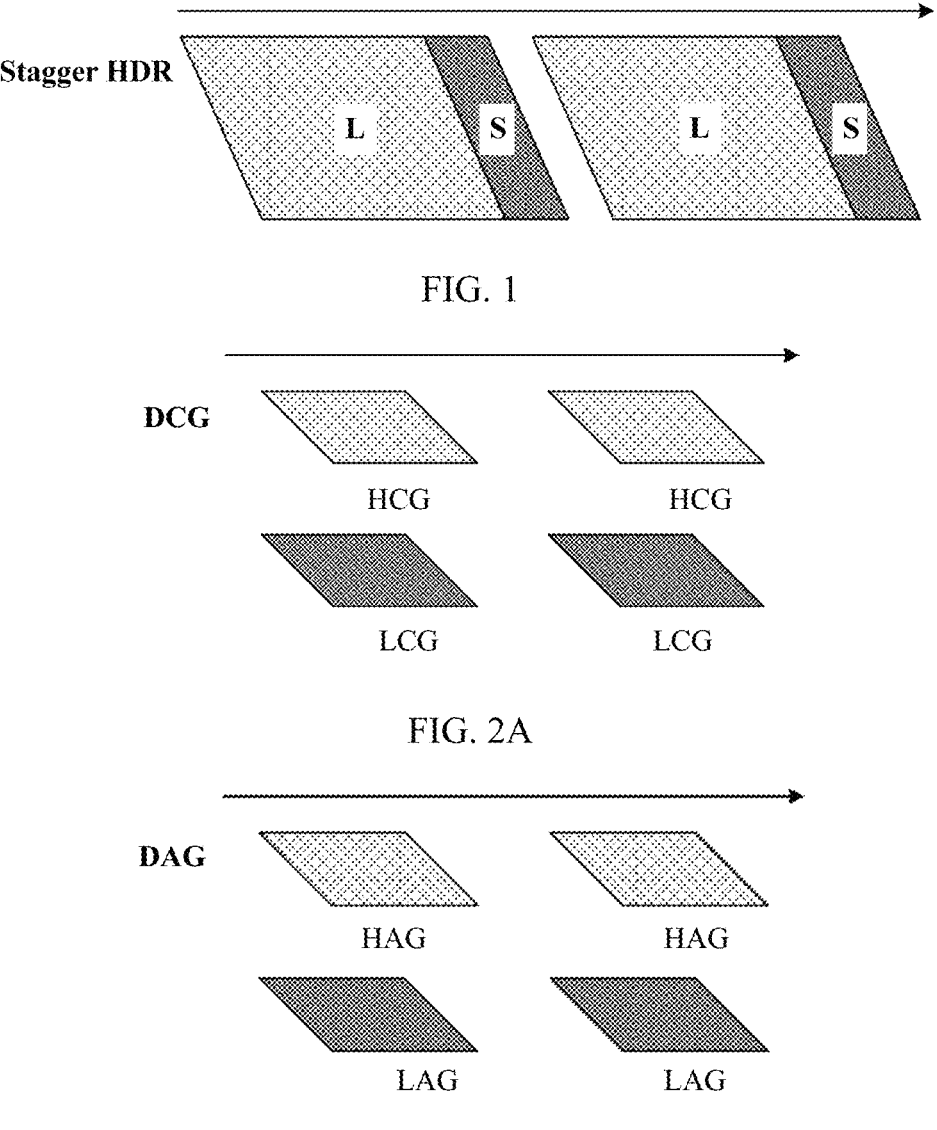
FIG. 1 is a schematic diagram of an image captured in a stagger high-dynamic range mode according to an embodiment of this application.
FIG. 2A and FIG. 2B are schematic diagrams of images captured in a DCG mode and a DAG mode according to an embodiment of this application.

It should be noted that, terms used in the DETAILED DESCRIPTION OF ILLUSTRATIVE EMBODIMENTS section of embodiments of this application are only used to explain specific embodiments of this application, and are not intended to limit this application. In the descriptions of the embodiments of this application, unless otherwise specified, "/" means "or". For example, A/B may represent A or B. In this specification, "and/or" is merely an association relationship for describing associated obstacles and represents that three relationships may exist. For example, "A and/or B" may represent the following three cases: only A exists, both A and B exist, and only B exists. In addition, in the descriptions of the embodiments of this application, unless otherwise specified, "a plurality of" means two or more than two, and "at least one" and "one or more" mean one, two, or more than two.

In the following, the terms "first" and "second" are used merely for the purpose of description, and shall not be construed as indicating or implying relative importance or implicitly indicating a quantity of indicated technical features. Therefore, features defined with "first" and "second" may explicitly or implicitly include one or more of the features.

As described in the specification, referring to "one embodiment" or "some embodiments" or the like means that one or more embodiments of this application include particular features, structures, or characteristics described with reference to the embodiments. Therefore, statements such as "in an embodiment", "in some embodiments", "in some other embodiments", or "in other embodiments" that appear in different parts of the specification do not necessarily refer to same embodiments, but mean "one or more but not all embodiments", unless otherwise specifically emphasized in other manners. The terms "include", "comprise", and "have" and variants thereof all mean "include but are not limited to", unless otherwise specifically emphasized in other manners.

The term "user interface" in the specification, claims, and accompanying drawings of this application is a media interface for interaction and information exchange between an application or an operating system and a user. The user interface is usually in a representation form of a graphical user interface (graphical user interface, GUI), and the graphical user interface is a user interface that is related to a computer operation and that is displayed in a graphical manner. The graphical user interface may be an interface element such as an icon, a window, or a control that is displayed on a display of an electronic device. The control may include visible interface elements such as an icon, a button, a menu, a tab, a text box, a dialog box, a status bar, a navigation bar, and a Widget.

With reference to introduction in the background, to overcome a problem that quality of a shot image is poor (a brightness difference is small) due to a limited dynamic range, a high dynamic range imaging (high dynamic range imaging, HDR) technology emerges. The HDR technology is a set of technologies that can achieve a larger exposure dynamic range (that is, a larger brightness difference), and aims to correctly represent a brightness range from direct emission of sunlight to a darkest shadow in a real world. In specific implementation of the HDR technology, a currently photographed object may be exposed by setting a plurality of groups of exposure values (exposure values, EV), including exposure performed by using a normal EV value obtained through current photometric calculation, and exposure separately performed by using an EV value (an EV value of EV−n) lower than the normal EV value and an EV value (an EV value of EV+n) higher than the normal EV value. Then, a plurality of exposed photos are fused, so that a local photo exposed with a high EV is used for an object in a dark part, and a local photo exposed with a low EV is used for an object in a bright part. Therefore, an entire photo scene is not excessively bright or excessively dark.

A relatively complex image processing algorithm is used in the foregoing manner in which a plurality of photos are surrounded and fused by using the EV to expand the dynamic range, and a sufficient interval needs to exist between two frames as calculation time. Generally, in a photo taking scenario, an interval between time for obtaining two consecutive frames of images is relatively long, which is sufficient to expand a dynamic range in a conventional HDR exposure manner. However, in a video recording scenario, to ensure smoothness of a picture, an image is usually collected and processed at a specific frame rate (frame rate), and a frame spacing is very short, that is, each frame (frame) corresponds to only extremely short calculation time (for example, when the frame rate is 30 fps, calculation time corresponding to each frame is less than 33 ms on average). In this case, in the video recording scenario, a dynamic range cannot be expanded in a conventional manner with relatively high complexity, and an adapted HDR solution needs to be customized based on a video recording feature.

In view of this, embodiments of this application provide a video processing method. In the method, seamless switching is performed between a plurality of types of HDR exposure manners based on a change in factors such as ambient brightness, a dynamic range, and a flicker, so that image collection and processing can be performed by using an HDR solution that adapts to an actual shooting state and a picture quality requirement, thereby effectively expanding a dynamic range in a video recording scenario and improving image picture quality in the video recording scenario.

To better understand the video processing method provided in the embodiments of this application, definitions of some terms that may be used in this specification are first described.

1. Stagger High-Dynamic Range (Stagger High-Dynamic Range, SHDR)

Manufacturers may have different names for a technology similar to the SHDR, for example, a related technology in Sony (Sony) is referred to as a digital overlap HDR (digital overlap HDR, DOL-HDR). An SHDR technology is a technology in which a frame rate of a sensor is increased to collect a plurality of frames of images with different exposure time in a collection cycle. Then, a corresponding long-exposure frame and a corresponding short-exposure frame are fused into one frame by using a multi-frame fusion technology, to obtain an image with a high dynamic range. The short-exposure frame (or referred to as a "short-exposure image") may obtain information about a bright part, the long-exposure frame (or referred to as a "long-exposure image") may obtain information about a dark part, and the long-exposure frame has excellent noise control. When the two frames of images are fused, highlight and shadow gains (gain) can be obtained.

For example, images collected by using the SHDR technology may be shown in FIG. 1, and include a frame of long-exposure image (a frame identified with a letter "L" in FIG. 1) and a frame of short-exposure image (a frame identified with a letter "S" in FIG. 1) that are periodically collected.

It should be noted that, due to impact of different exposure periods and exposure duration, the SHDR may be unable to obtain an ideal shooting effect in some scenarios. For example, compared with a shooting scenario using non-SHDR exposure, images under a plurality of exposure parameters (for example, exposure time) need to be collected in an SHDR scenario, and therefore a blank frame spacing between two frames of images is shorter, and the SHDR is not applicable to a scenario in which an image processing algorithm is excessively complex. In addition, two frames that are used to be fused into one image in the SHDR are respectively from different exposure periods, and correspond to different exposure duration. In addition, longer exposure time indicates that it is more likely to generate smearing (or ghosting). During fusion, motion ghosting is inevitably generated (a relatively ideal effect can be achieved only in a high brightness scenario in which exposure time of both the two frames is very short).

2. Binning (Binning)

Binning is an image readout mode in which induced charges in adjacent pixels are added together and read out in a mode of one pixel. For example, in a process in which an electronic device shoots an image, light reflected by a target object is collected by a camera, so that the reflected light is transmitted to an image sensor. The image sensor includes a plurality of photosensitive elements. A charge collected by each photosensitive element is one pixel, and a Binning operation is performed on pixel information. Specifically, n×n pixels may be combined into one pixel through Binning. For example, adjacent 2×2 pixels may be synthesized into one pixel through Binning. In other words, colors of the adjacent 2×2 pixels are presented in a form of one pixel.

3. Dual Conversion Gain (Dual Conversion Gain, DCG)

The DCG is also an image readout manner, and may be understood as a capability of performing reading twice in one pixel cell circuit, or may be understood as that two capacitors that store photon energy exist in a photosensitive unit corresponding to one pixel. The DCG used in the embodiments of this application may specifically refer to performing two conversion gains on an image that is based on one exposure operation and then reading an image obtained after the two conversion gains.

In the embodiments of this application, a dynamic range may be expanded by using the DCG. An implementation principle of the DCG is as follows: For an image sensor having a dual conversion gain DCG capability, one pixel has two potential wells, the two potential wells correspond to different full well capacities and different conversion gains CGs, a large full well capacity corresponds to a low conversion gain (low conversion gain, LCG) and a low photosensibility, and a small full well capacity corresponds to a high conversion gain (high conversion gain, HCG) and a high photosensibility. In this way, the sensor may use two potential wells (two photosensibilities) and two conversion gains in a same scenario, to obtain two images through one time of exposure: an image in a high photosensibility mode and an image in a low photosensibility mode. Further, an electronic device synthesizes the two obtained images into one image, which is an HDR technology.

For example, based on same short exposure, images read by the DCG twice may be respectively shown in FIG. 2A. An LCG frame is a frame of image read by using an LCG gain signal, and can protect a highlight area from excessive exposure. An HCG frame is a frame of image read by using an HCG gain signal, and can improve shadow brightness while controlling noise. Then, the two frames of images are fused to obtain highlight and shadow gains, and obtain an image obtained after dynamic range optimization.

4. Dual Analog Gain (Dual Analog Gain, DAG)

As another image readout manner, similar to the dual conversion gain DCG described above, the DAG also reads two frames of images based on one time of exposure by using two analog signals. A difference lies in that the DCG and the DAG have different readout manners. In the DAG readout mode, an image is read by respectively using two analog gains, and the two analog gains include a low analog gain (low analog gain, LAG) and a high analog gain (high analog gain, HAG). The LAG can protect a highlight area from excessive exposure, and the HAG can brighten a shadow while controlling noise.

For example, based on same short exposure, images read by the DAG twice may be respectively shown in FIG. 2B. An LAG frame is a frame of image read by using the LAG, and an HAG frame is a frame of image read by using the HAG. Then, the two frames of images are fused to obtain highlight and shadow gains, thereby expanding a dynamic range. Compared with a conversion gain (conversion gain, CG), an analog gain (analog gain, AG) has a better noise control capability.

It should be noted that, because the two frames of images that are of each of the DCG and the DAG are from different reading in one time of exposure, a ghosting problem does not exist after the two frames of images are fused, which is applicable to widespread use in various video recording scenarios.

It should be further noted that, in the embodiments of this application, the foregoing DCG and DAG technologies may be further superposed to expand a dynamic range. For ease of description, a manner in which the DCG and the DAG are used in superposition is referred to as a DXG in the embodiments of this application. For example, the DCG and the DAG may be superposed based on a photosensitivity ratio. For example, if a photosensitivity ratio between an image read by using a high gain signal and an image read by using a low gain needs to be 1:16, the DCG may be used to obtain two frames of images that have a photosensitivity ratio of 1:2, and then the DAG may be used to obtain two frames of images that have a photosensitivity ratio of 1:8. After the photosensitivity ratios of the foregoing four images are multiplied, images that have a photosensitivity ratio of 1:16 are obtained.

5. Single-Frame Dynamic Range DXG (Intra-Scene DXG, iDXG)

For ease of distinguishing, in the embodiments of this application, a manner in which two frames obtained in a DXG manner are fused into one frame in an image sensor is referred to as iDXG.

6. RAW Image (or Referred to as a RAW Domain Image)

The RAW domain image, namely, the raw image, includes data processed by an image sensor of a digital camera, a scanner, or a movie film scanner. The RAW image includes most raw information of an image, and does not undergo non-linear processing in an image signal processing (image signal processing, ISP) process.

7. HDR10 Video

The HDR10 video is configured based on static metadata. For example, a PQ conversion curve of HDR10 is fixedly mapped based on reference display brightness of a display. A bit depth of the HDR10 video is 10 bits. The static metadata may meet a definition in SMPTE ST2086 or another standard.

8. HDR10+ Video

HDR10+ is a further improvement based on an HDR. The HDR10+ supports dynamic metadata, to be specific, the HDR10+ can adjust or enhance image brightness, contrast, color saturation, and the like based on different scenarios in a video, so that each frame of picture in the HDR10+ video has an independently adjusted HDR effect. A bit depth of the HDR10+ video is 12 bits. The dynamic metadata may meet a definition in SMPTE ST2094 or another standard.

9. Brightness Scenario

The brightness scenario may also be referred to as a brightness level. In the embodiments of this application, the brightness scenario may be used to determine an exposure manner (a DXG or an SHDR) for image collection. The brightness scenario may include a high brightness scenario, a medium brightness scenario, a dark light scenario, and the like.

For example, the brightness scenario may correspond to different brightness ranges, and a device may distinguish between different brightness levels based on intensity of light reflected by a photographed object. For example, a brightness range corresponding to the high brightness scenario may be greater than 50000 lux (lux), a brightness range corresponding to the medium brightness scenario may be 50000 lux-10 lux, and a brightness range corresponding to the dark light scenario may be 10 lux-0 lux.

It should be noted that the brightness level described in the embodiments of this application may not be limited to the foregoing three types. In addition, the brightness ranges corresponding to the three brightness scenarios are merely used as examples, and values of brightness ranges corresponding to different brightness scenarios may alternatively be other values. This is not limited in the embodiments of this application.

Figure 3:
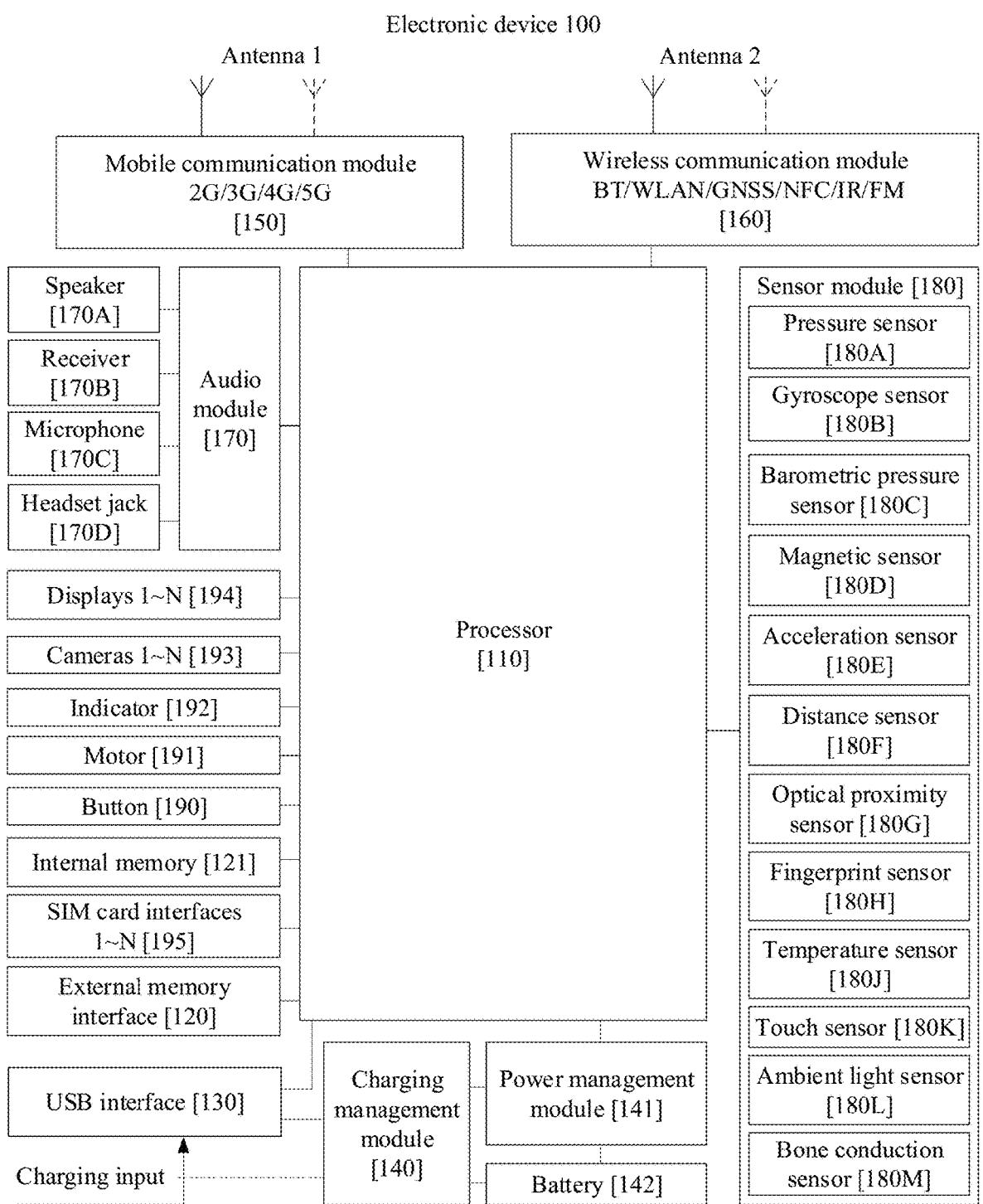
FIG. 3 is a schematic diagram of a structure of an electronic device 100 according to an embodiment of this application.

For example, FIG. 3 is a schematic diagram of a structure of an electronic device 100 according to an embodiment of this application.

FIG. 3 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or components may be arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a timing signal, to complete control of instruction fetching and instruction execution.

The memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution for wireless communication including 2G/3G/4G/5G and the like applied to the electronic device 100. The mobile communication module 150 may include at least one filter, switch, power amplifier, low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution for wireless communication that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation systems, SBAS).

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mic" or "mike", is configured to convert a sound signal into an electrical signal. At least one microphone 170C may be disposed in the electronic device 100.

The headset jack 170D is configured to connect to a wired headset.

The sensor module 180 may include one or more sensors, and these sensors may be of a same type or different types. The sensor module 180 may include a pressure sensor, a gyroscope sensor, an acceleration sensor, a distance sensor, an optical proximity sensor, a fingerprint sensor, a touch sensor, an ambient light sensor, and the like.

The button 190 includes a power on/off button, a volume button, and the like. The button 190 may be a mechanical button, or may be a touch button. The electronic device 100 may receive a key input and generate a key signal input related to user settings and function control of the electronic device 100.

The display 194 is configured to display an image, a video, and the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a Mini LED, a Micro LED, a Micro-OLED, a quantum dot light emitting diode (Quantum Dot Light Emitting Diode, QLED), or the like. In some embodiments, the electronic device 100 may include one or N displays 194, where N is a positive integer greater than 1.

The electronic device 100 implements a display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs that execute program instructions to generate or change displayed information.

The electronic device 100 may implement a shooting function by using the ISP, the camera 193, the video codec, the GPU, the display 194, the application processor, and the like.

The digital signal processor is configured to process a digital signal, and may process another digital signal in addition to a digital image signal. For example, when the electronic device 100 selects a frequency, the digital signal processor is configured to perform Fourier transform and the like on frequency energy. The video codec is configured to compress or decompress a digital video. The NPU is a neural-network (neural-network, NN) computing processor, which quickly processes input information by referring to a biological neural network structure, for example, by referring to a transmission mode between human brain neurons, and may further perform self-learning continuously.

The external memory interface 120 may be configured to connect to an external storage card, for example, a Micro SD card, to expand a storage capability of the electronic device 100. The external storage card communicates with the processor 110 through the external memory interface 120, to implement a data storage function, for example, to store files such as music and videos in the external storage card.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image/video playing function), and the like. The data storage area may store data (for example, audio data and a phone book) and the like created during use of the electronic device 100.

In some embodiments, the internal memory 121 may store code related to automatic exposure control (automatic exposure control, AEC) and an exposure mode switching method. The processor may implement an automatic exposure control process by running the code related to AEC, and may implement switching of an exposure mode of an image sensor in a camera by running the code related to the exposure mode switching method.

In some embodiments, an AEC module may include an AEC algorithm module and an AEC statistics collecting module. The AEC statistics collecting module is configured to collect statistics about and analyze a parameter in a collected image, for example, image brightness. The AEC algorithm module may automatically adjust an exposure parameter of a camera based on a statistics collecting result, and the AEC algorithm module may further estimate ambient light brightness based on the statistics collecting result.

The electronic device 100 may implement an image obtaining function by using the ISP, the camera 193, the video codec, the GPU, the display 194, the application processor, and the like.

The ISP is configured to process data fed back by the camera 193. For example, during shooting, a shutter is opened, and light is transmitted to a photosensitive element of the camera by using a lens. An optical signal is converted into an electrical signal. The photosensitive element of the camera transmits the electrical signal to the ISP for processing, to convert the electrical signal into an image or a video visible to naked eyes. The ISP may further perform algorithm optimization on noise, brightness, and complexion of the image. The ISP may further optimize parameters such as exposure and color temperature of a shooting scenario. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transmits the electrical signal to the ISP to convert the electrical signal into a digital image or a video signal. The ISP outputs the digital image or the video signal to the DSP for processing. The DSP converts the digital image or the video signal into an image or a video signal in a standard format, for example, RGB or YUV.

In some embodiments, the electronic device 100 may include one or N cameras 193, where N is a positive integer greater than 1. For example, in some embodiments, the electronic device 100 may obtain images of a plurality of exposure coefficients by using the N cameras 193. Further, during video post-processing, the electronic device 100 may composite an HDR image based on the images of the plurality of exposure coefficients by using a high dynamic range (High Dynamic Range, HDR) technology.

The video codec is configured to compress or decompress a digital video. The electronic device 100 may support one or more video codecs. In this way, the electronic device 100 may play or record videos in a plurality of coding formats, such as moving picture experts group (Moving Picture Experts Group, MPEG)1, MPEG2, MPEG3, and MPEG4.

The NPU is a neural-network (Neural-Network, NN) computing processor, which quickly processes input information by referring to a biological neural network structure, for example, by referring to a transmission mode between human brain neurons, and may further perform self-learning continuously. Applications such as intelligent cognition of the electronic device 100, for example, image recognition, face recognition, speech recognition, and text understanding, may be implemented by using the NPU.

The SIM card interface 195 is configured to connect to a SIM card. The SIM card may be inserted into the SIM card interface 195 or removed from the SIM card interface 195 to implement contact with and separation from the electronic device 100. The electronic device 100 may support one or N SIM card interfaces, where N is a positive integer greater than 1. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

For example, a software system of the electronic device 100 may use a layered architecture, an event-driven architecture, a microkernel architecture, a microservice architecture, or a cloud architecture. In the embodiments of the present invention, an Android system with a layered architecture is used as an example to describe a software structure of the electronic device 100.

Figure 4:
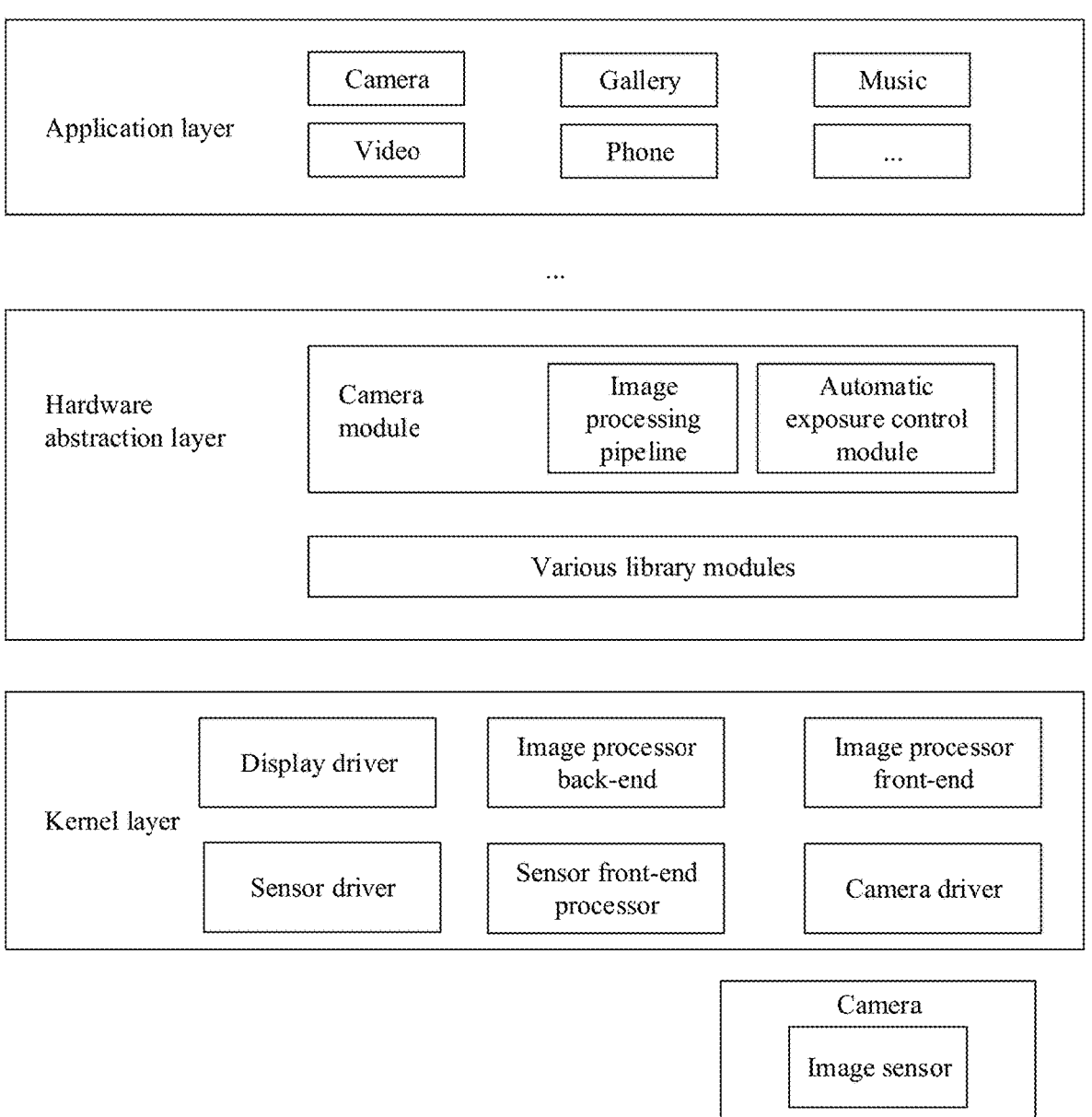
FIG. 4 is a block diagram of a software structure of an electronic device 100 according to an embodiment of this application.

For example, FIG. 4 is a block diagram of a software structure of an electronic device 100 according to an embodiment of this application.

In some embodiments, in the layered architecture, software is divided into several layers, and each layer has a clear role and task. The layers communicate with each other through a software interface. In this embodiment of this application, specifically, the system may include an application layer, a hardware abstraction layer, and a kernel layer from top to bottom. An application framework layer, a system library, runtime, and the like may be further included between the application layer and the hardware abstraction layer.

The application layer may include a series of application packages. As shown in FIG. 4, the application package may include application (or referred to as applications) such as Camera, Gallery, Music, Video, Phone, and the like.

The hardware abstraction layer shields differences between different hardware devices, and provides a standard interface for the system. As shown in FIG. 4, the hardware abstraction layer transmits data to the kernel layer by using a standard HAL interface, and receives data uploaded by the kernel layer. The hardware abstraction layer may include a plurality of library modules. Each library module implements a group of interfaces for a specific type of hardware component, for example, a wireless fidelity (wireless fidelity, Wi-Fi)/Bluetooth (bluetooth) module and a camera module. When an application interface at the application framework layer requests to access device hardware, the system loads a corresponding library module for the hardware.

In some embodiments, the hardware abstraction layer may further include a camera module. The camera module may include an automatic exposure control (automatic exposure control, AEC) module and an image processing pipeline. The AEC module may be configured to implement automatic exposure control. Specifically, the AEC module may obtain an exposure parameter from a system configuration file, and configure the exposure parameter for an image sensor. The image sensor captures an image based on the exposure parameter. An AEC statistics collecting module in the AEC module may collect statistics about and analyze a parameter in a collected image, for example, image brightness. The AEC module may further estimate a dynamic range compression gain (adrc gain) based on the foregoing exposure parameter and image brightness that are used during image collection. An exposure mode control module may be configured to control an exposure mode of an image sensor in a camera based on estimated ambient light brightness. Specifically, in a bright light scenario, the image sensor may be controlled to work in a low-photosensitivity mode to prolong exposure time, so that the exposure time meets an exposure time requirement of video shooting.

The kernel layer is a layer between hardware and software. The kernel layer includes at least a display driver, a camera driver, a sensor driver, a sensor front-end processor, an image processor front-end, an image processor back-end, and the like. The exposure mode control module may control, by using the camera driver, the exposure mode of the image sensor in the camera, and the AEC module may configure an exposure parameter for the camera by using the camera driver.

The following describes examples of working procedures of software and hardware of the electronic device 100 with reference to a video recording scenario.

When the touch sensor receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a tap operation, and a control to which the tap operation is applied is a control of a Camera application icon. A Camera application invokes an interface at the application framework layer to start the Camera application, then starts the camera driver by invoking the kernel layer, and captures a video image by using the camera 193. The display 194 displays a preview interface of a camera, and the preview interface displays the captured video image.

It should be understood that, because a dynamic range, a flicker, ambient brightness, and the like all affect image quality, image exposure and processing need to be performed in different scenarios by using an HDR solution adapted to an actual shooting situation. To effectively expand a dynamic range and obtain a high-quality video picture in the video recording scenario, in the video processing method provided in the embodiments of this application, a correspondence between a specific influence factor and an exposure manner is established, and then seamless switching is performed between a plurality of HDR solutions in a video shooting process based on an actual situation of the influence factor, to implement a processing manner that adapts to a high-dynamic range influence factor, thereby effectively expanding a dynamic range in the video recording scenario.

To better understand the video processing method provided in the embodiments of this application, the following describes a difference between several exposure manners used in this application and specific cases in which the several exposure manners are respectively used.

Figure 5:
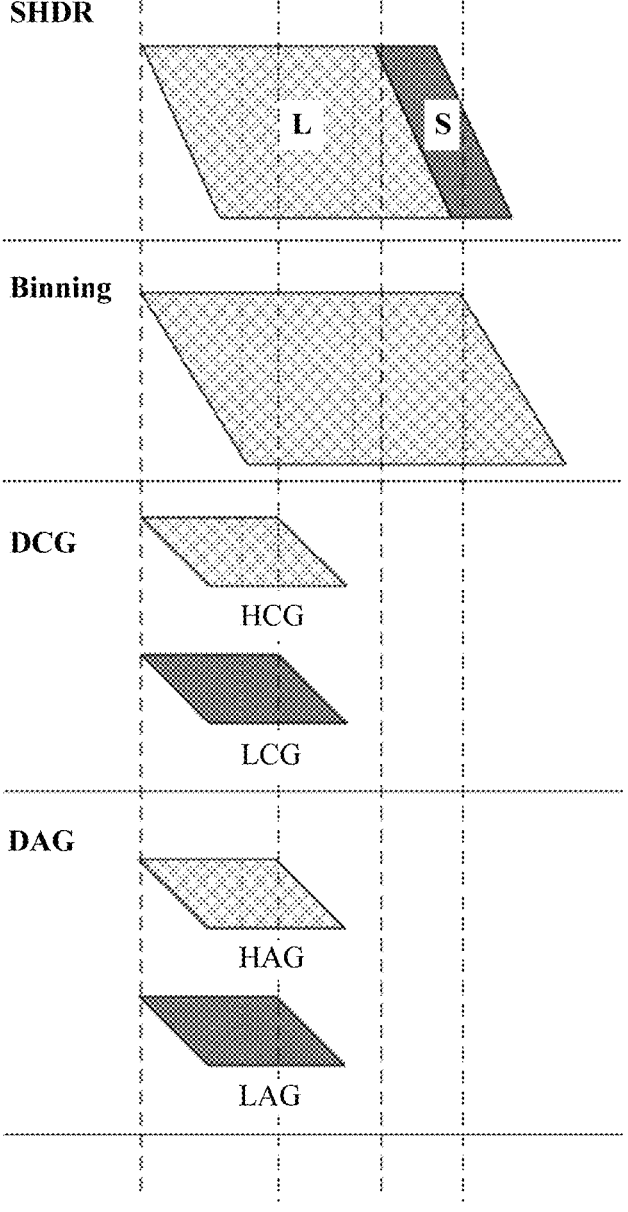
FIG. 5 is a schematic diagram of a difference between related parameters corresponding to a plurality of exposure modes according to an embodiment of this application.

For example, FIG. 5 is a diagram of a time sequence in a process of respectively collecting an image in an SHDR exposure manner, a Binning exposure manner, and a DXG exposure manner according to an embodiment of this application.

In the SHDR exposure manner, a long frame of image and a short frame of image are obtained by changing a shutter speed (that is, an exposure condition), thereby reducing computing power of subsequent image reading and processing. However, when exposure time is relatively long, SHDR exposure manner easily causes ghosting in an image. Therefore, SHDR exposure manner is applicable to a scenario in which exposure time is relatively short (ambient brightness is relatively high).

The Binning exposure manner is single-frame exposure. Compared with the DXG exposure manner, the Binning exposure manner has relatively long exposure time, for example, the exposure time may be longer than long exposure time in the SHDR exposure manner. Using the several exposure manners shown in FIG. 5 as an example, the exposure time corresponding to the Binning exposure manner may be longest. A specific exposure time value may be set based on a requirement. This is not limited in this embodiment of this application.

In the DXG exposure manner, two gain signals (a conversion gain signal and an analog gain signal) are simultaneously exposed to obtain two frames of images with different gains (a conversion gain or an analog gain). Although a process of obtaining the images is relatively complex, the manner does not cause a ghosting problem and exposure time is short. Therefore, the exposure manner may be applied to a scenario with medium or low ambient brightness.

Based on features of the foregoing exposure manners, for a scenario with a relatively small dynamic range, an image brightness difference is small, and the Binning single-frame exposure manner may be used; and for a scenario with a relatively large dynamic range, it may be further determined whether a flicker exists in the current scenario, that is, flicker determining is performed. If the flicker exists, the Binning exposure manner is used because the Binning exposure manner has relatively long exposure time, which can effectively overcome a flicker phenomenon caused by a periodic change in an alternating current. If no flicker exists, it may be further determined, based on ambient brightness, whether to use the SHDR exposure manner or the DXG exposure manner. When the ambient brightness is relatively high, the SHDR exposure manner is used, and when the ambient brightness is relatively low, the DXG exposure manner is used.

For example, the following Table 1 shows examples of exposure manners corresponding to different influence factors.

TABLE 1

| Influence factor | Exposure manner |
|---|---|
| High ambient brightness + high dynamic range | SHDR |
| Medium/low ambient brightness + high dynamic range | DXG |
| Low dynamic range | Binning |
| Flicker phenomenon exists | Binning |
| Thermal escape phenomenon exists | Binning |

It should be noted that the influence factors described above are merely examples. In actual application, a type of an influence factor may be flexibly set based on a requirement. For example, in some cases, only a dynamic range and ambient brightness in a shooting scenario may be considered, and a flicker factor and the like are ignored. This is not limited in this embodiment of this application.

The video processing method provided in the embodiments of this application may be applied to a plurality of scenarios in which HDR processing needs to be performed, and particularly, may be applied to an HDR processing scenario in a video recording process. For example, FIG. 6A to FIG. 6D are schematic diagrams of some graphical user interfaces (graphical user interface, GUI) that may be used in a video processing method implementation process according to an embodiment of this application. For ease of understanding, a GUI in a mobile phone is used as an example herein for description.

It should be noted that, in this embodiment of this application, there are a plurality of manners for triggering a video processing process. For example, the video processing process may be triggered by inputting a tap operation on a smart HDR switch control disposed in the mobile phone. For another example, when the mobile phone is powered on, a smart HDR function may be enabled by default, that is, the video processing process may be triggered immediately when the mobile phone is powered on.

Figure 6A:
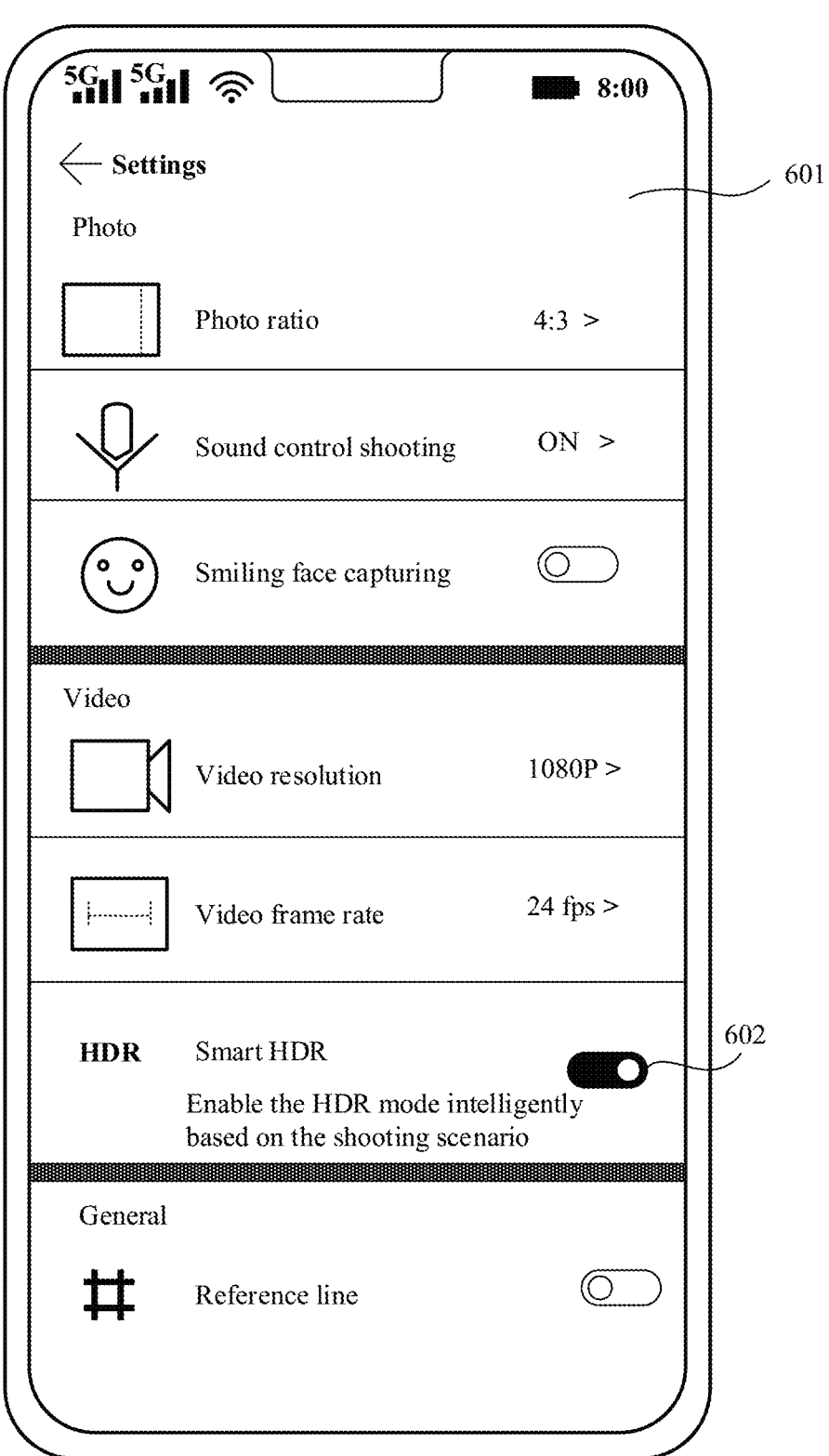
FIG. 6A to FIG. 6D are schematic diagrams of some GUIs that may be used in a video processing process according to an embodiment of this application.

In a possible implementation, the smart HDR switch control may be disposed in a Settings application of the mobile phone. For example, FIG. 6A is a schematic diagram of a setting interface that includes a smart HDR switch control. The setting interface 601 includes a shooting parameter setting area, a video parameter setting area, a general setting area, and the like. The shooting parameter setting area may specifically include a photo ratio setting bar, a sound control shooting function setting bar, a smiling face capturing setting bar, and the like. The video parameter setting area may specifically include a video resolution setting bar, a video frame rate setting bar, a smart HDR setting bar, and the like. The general setting area may specifically include a reference line function setting bar, a level instrument function setting bar (not shown in the figure), a timed shooting function setting bar (not shown in the figure), and the like. The smart HDR setting bar includes a smart HDR switch control. When a user enables the smart HDR function by using the switch control, the mobile phone may intelligently enable an HDR mode based on a shooting scenario in a video recording process.

Figure 6B:
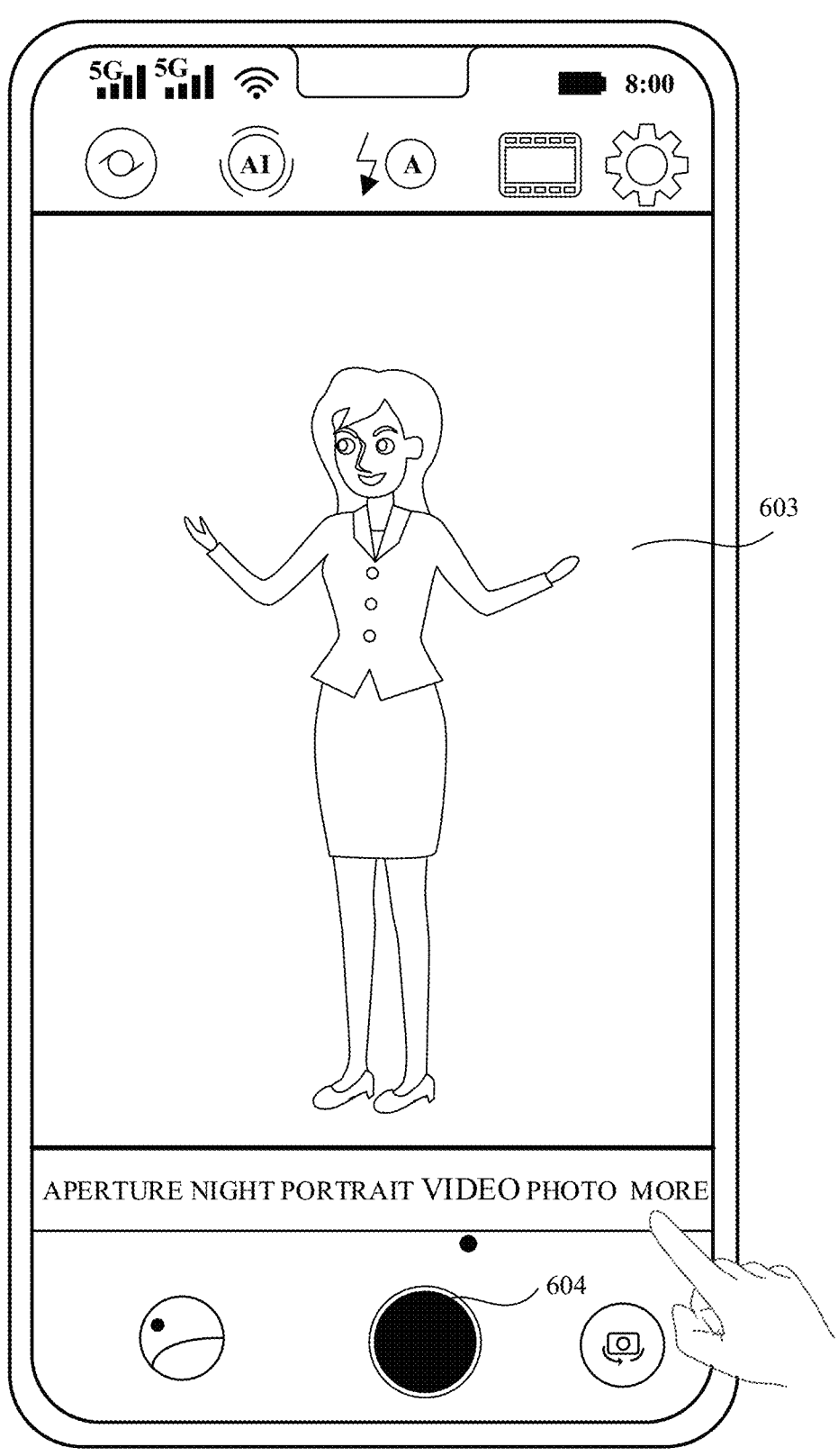
Figure 6C:
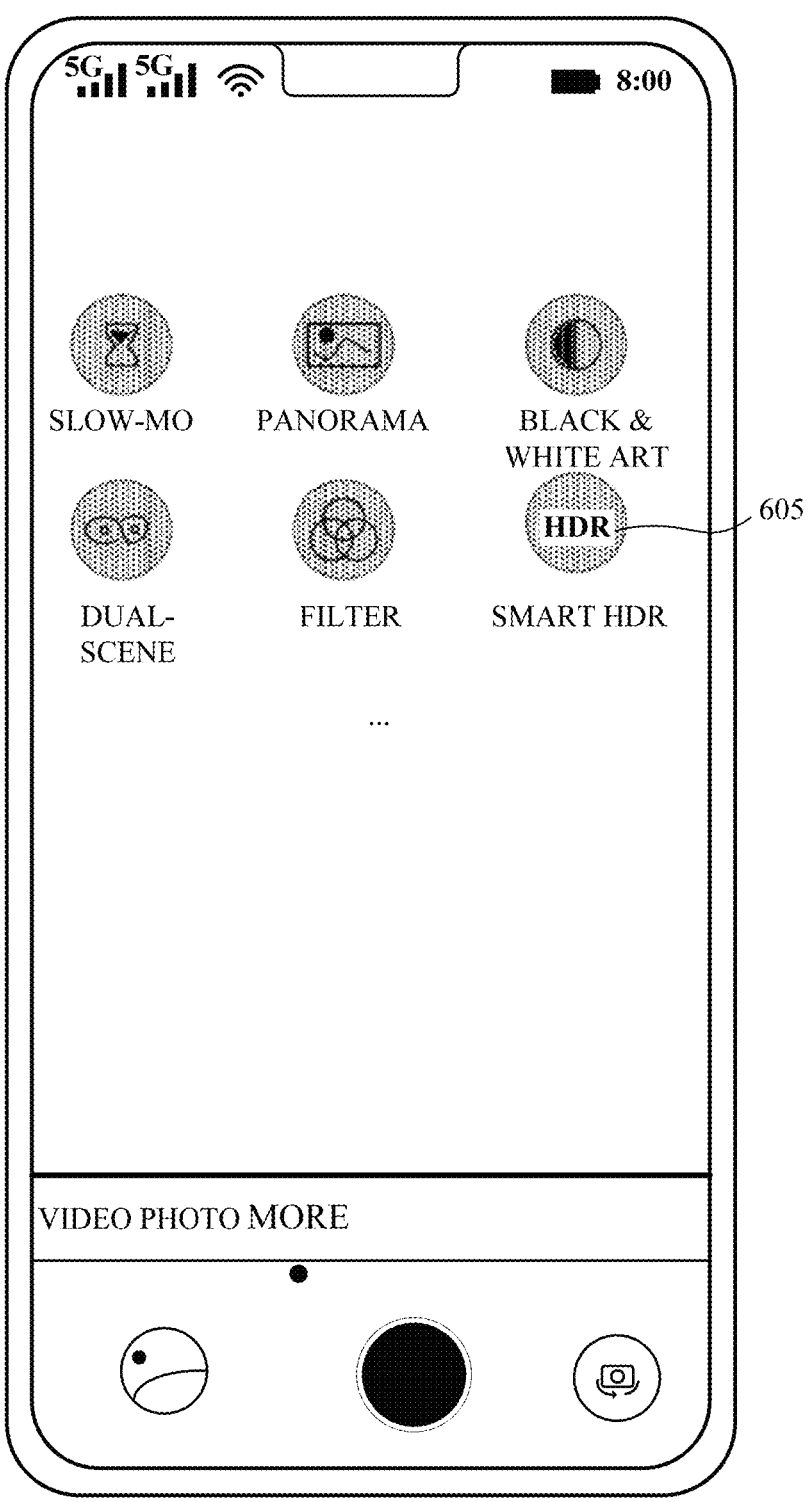
Figure 6D:
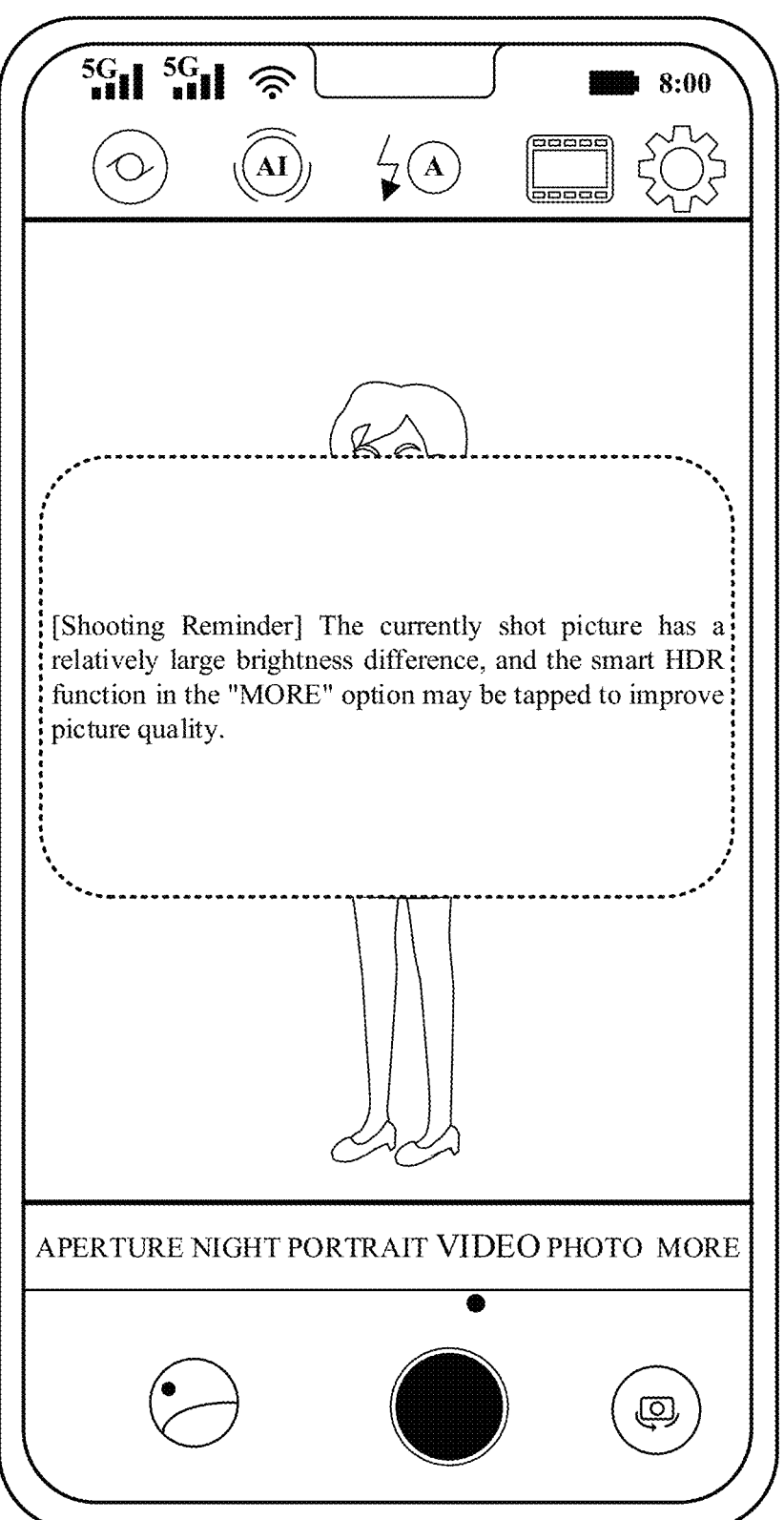

In another possible implementation, the smart HDR switch control may alternatively be disposed in a Camera application of the mobile phone. For example, FIG. 6B and FIG. 6C are schematic diagrams of GUIs that may be used when a smart HDR function is enabled by using a Camera application. Specifically, a camera main interface 603 shown in FIG. 6B may be displayed after the mobile phone receives an enable operation (for example, a tap operation on a Camera icon in the main interface or a lock screen interface) performed by a user on the Camera application. For example, the camera main interface 603 may include an image preview area, a mode setting area, a shooting control, and the like. The mode setting area 605 may include a viewfinder frame, an album icon, a shooting control 604, a rotation control, and the like.

The viewfinder frame is configured to obtain and shoot a preview image and display the preview image in real time. The album icon is used for quickly entering an album. After detecting that a user taps the album icon, the mobile phone may display a shot photo, a shot video, or the like on a touchscreen. The shooting control 604 is configured to perform shooting or video recording. After the mobile phone detects that a user taps the shooting control, the mobile phone performs a photo taking operation and stores a shot picture; or when the mobile phone is in a video recording mode, after a user taps the shooting control, the mobile phone performs a video recording operation and stores a recorded video. The camera rotation control is configured to control switching between a front-facing camera and a rear-facing camera.

In addition, the camera main interface 603 further includes a function control used for setting a shooting mode, for example, an APERTURE shooting mode, a NIGHT shooting mode, a PORTRAIT shooting mode, a VIDEO mode, a PHOTO mode, and MORE shown in FIG. 6B. As shown in FIG. 6C, MORE may further include a SLOW-MO mode, a PANORAMA mode, a BLACK & WHITE ART mode, a DUAL-SCENE video recording mode, a FILTER mode, a SMART HDR mode, and the like.

In some embodiments, when shooting a video by using the Camera application, a user may input a specific operation on a smart HDR icon shown in FIG. 6C to enable the smart HDR function.

In some embodiments, when the smart HDR switch control is turned on, an artificial intelligence (artificial intelligence, AI) prompt capability may be supported in a video preview scenario (recording is not started). For example, in a scenario with high ambient brightness and a high dynamic range, a corresponding exposure manner is in an SHDR state. In this case, a preview interface may display prompt information: "backlight HDR". For another example, in scenario with medium/low ambient brightness and a high dynamic range, a corresponding exposure manner is in a DXG state. When ambient brightness is less than a specific threshold, the preview interface may display prompt information: "night HDR".

It should be noted that locations of the smart HDR switch controls shown in FIG. 6A to FIG. 6C are merely examples. In actual application, the smart HDR switch control is unnecessarily disposed in the Settings application and the Camera applications. In addition, the foregoing embodiment is described by using only an example in which a user enables the smart HDR function of the mobile phone. However, in some other embodiments, there may be a plurality of manners for enabling the smart HDR function. For example, when the mobile phone is powered on, the smart HDR function may be enabled by default. For another example, when detecting that a preset trigger event occurs, the mobile phone may automatically enable the smart HDR function. In still other embodiments, if an electronic device does not support the smart HDR function (for example, due to a hardware limitation), an HDR switch control icon may be set to be gray. This is not limited in this application.

In some embodiments, when an electronic device detects that a scenario brightness difference is relatively large in a current shooting environment, and the smart HDR function is in a disabled state, the electronic device may further prompt a user to enable the smart HDR function in a plurality of manners. For example, when a user photographs a cave with backlight, a brightness level of a backlight part is relatively high, and a brightness level of a cave part is relatively low, and a difference between the two brightness levels is relatively large. In this case, a shooting device may prompt the user to enable the smart HDR function through (artificial intelligence, AI). For example, prompt information "The currently shot picture has a relatively large brightness difference, and the smart HDR function in the "MORE" option may be tapped to improve picture quality" shown in FIG. 6D may be displayed in a shooting interface.

In some embodiments, when the smart HDR function is in an enabled state, in a shooting process, the mobile phone may perform exposure and image processing based on an HDR solution that matches a current actual shooting situation, to obtain a video picture with a high dynamic range. A shot picture obtained when the smart HDR function is enabled can more clearly present details of a bright area and a dark area, so that there is no case in which details are blurred due to excessively high brightness or excessively low brightness.

It should be noted that, a preset HDR solution herein refers to an HDR solution determined by the mobile phone based on factors such as a dynamic range corresponding to an actual shooting environment, a flicker status, and brightness of the shooting environment. A difference between different HDR solutions mainly lies in a difference between exposure manners and image processing manners. In actual application, the mobile phone may seamlessly switch between a plurality of supported exposure manners based on an actual shooting condition. With reference to the foregoing description, an exposure manner that may be provided for selection in this embodiment of this application may include, for example, an SHDR, a DXG, and Binning. It should be noted that, in different scenarios, exposure manners that are provided for selection and use may be different. For example, due to a limitation of hardware performance of a device, for a device that does not support the DXG exposure manner, an exposure manner that may be provided for selection may alternatively include only the SHDR and the Binning.

In some embodiments, an underlying implementation process of controlling the smart HDR switch control may include: The HAL reports a multi-state switching video HDR capability to distinguish between products. An APP configures the "smart HDR" switch based on the reported capability. Based on a mode and a scenario, the APP determines a switch status: enabled/disabled/set to be gray. The APP delivers an HDR capability enabling and disabling command to the HAL based on the switch status. When the "smart HDR" switch is disabled, only a Binning capability is used. The HAL reports an AEC HDR status tag, to support an AI prompt and recommendation.

The foregoing describes principles of different exposure manners and smart HDR enabling manners. To better understand the video processing method provided in the embodiments of this application, the following describes a specific functional module that specifically performs the method and a bottom implementation process of the method.

Figure 7:
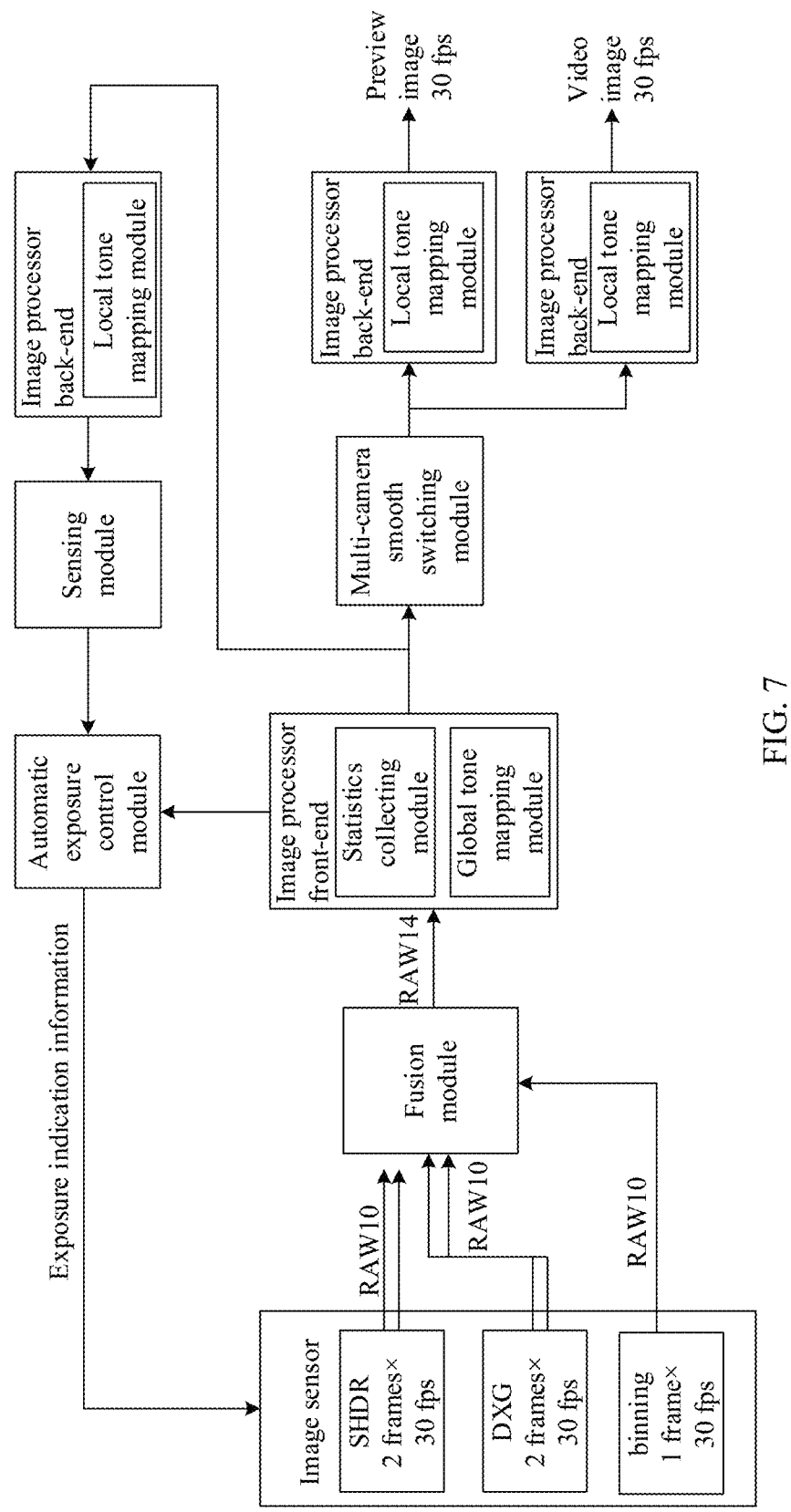
FIG. 7 is a schematic diagram of a video processing method according to an embodiment of this application.

For example, FIG. 7 is a schematic diagram of data flow interaction between related modules during implementation of a video processing method according to an embodiment of this application.

As shown in FIG. 7, an electronic device 100 includes an image sensor (camera sensor), an automatic exposure control (automatic exposure control, AEC) module, a sensor front-end processor (or referred to as a fusion module), an image processor front-end, a multi-camera smooth switching module, an image processor back-end and a local tone mapping (local tone mapping, LTM) module included in the image processor back-end, and the like.

The image sensor may correspond to the camera 193 shown in FIG. 3, and is mainly configured to shoot a video image. In some embodiments, the image sensor collects an image frame through exposure, and when reflected light of a photographed object passes through a lens, the reflected light converges on the image sensor. The image sensor may convert an optical signal into an analog electrical signal, and transmit the analog electrical signal to the fusion module. The image sensor outputs a raw digital image, that is, a raw (RAW) image, collected for the fusion module. In some embodiments, in an initial phase of shooting (when a camera is enabled), the image sensor may collect an image in a default exposure manner. Subsequently, after determining an exposure manner that adapts to a current shooting condition, the image sensor may perform shooting in a target manner under indication of the AEC module. The default exposure manner may be, for example, a Binning exposure manner. This is not limited in this embodiment of this application.

In some embodiments, when different exposure manners are used to collect an image, the image sensor may output different quantities of frames for a same picture at a same moment. For example, when shooting is performed in the Binning exposure manner, the image sensor outputs a single frame (for example, a long-exposure frame in FIG. 1); and when shooting is performed in a DXG exposure manner, the image sensor outputs double frames.

In addition, in this embodiment of this application, the image sensor may further perform image fusion. For example, in the DXG exposure manner, after obtaining two frames of images, the image sensor may fuse the two frames of images into one frame. The image sensor may be further configured to adjust an image parameter (such as an image size or a bit depth), for example, adjust sizes of images obtained in different exposure manners to a same target size; or adjust bit depths of images obtained in different exposure manners to a same target bit depth, and so on.

The sensor front-end processor (that is, the fusion module) is configured to fuse RAW image frames collected by the image sensor, to implement single-frame input and single-frame output or two-frame input and single-frame output.

For example, two frames of images with different exposure time may be obtained in an SHDR exposure manner. Therefore, when shooting is performed in the SHDR exposure manner, initial images input by the image sensor to the fusion module may be two frames of images with a specific frame rate (such as 30 fps) and different exposure time, that is, a dual-frame mode. After obtaining the initial images, the fusion module fuses the two frames of images with different exposure time into one frame, and adjusts a parameter of a fused image to a preset target parameter, for example, adjusts an initial format RAW10 of the input image to a target format RAW14.

For another example, the DXG exposure manner is that two frames of images are obtained based on one time of exposure. Therefore, when shooting is performed in the DXG exposure manner, one time of exposure of the image sensor may correspondingly input two initial images to the fusion module, which is also a dual-frame mode. The two initial images may be images respectively read by using a high conversion gain and a low conversion gain, or the two frames of images may be images respectively read by using a high analog gain and a low analog gain, or the two frames of images may be images obtained after images read by using a conversion gain and an analog gain are superposed. An initial format of the input image may be, for example, RAW10, and a frame rate may be, for example, 30 fps. After obtaining the initial images, the fusion module fuses the two frames of images read by using different gains into one frame, and may adjust a parameter of a fused image to a preset target parameter, for example, adjust the input initial format RAW10 to a target format RAW14.

For still another example, a single frame of image may be obtained in the Binning exposure manner. When shooting is performed in the Binning exposure manner, one time of exposure of the image sensor may correspondingly input a single frame of initial image to the fusion module, that is, a single-frame mode. After obtaining the initial image, the fusion module does not need to perform image fusion, but may adjust an image parameter based on a requirement, for example, adjust an input initial format RAW10 to a target format RAW14.

It should be noted that, a purpose of adjusting a format of an initial image is to unify images obtained in different exposure manners into a same format (a size, a bit depth, and the like), so that a picture size does not jump when a video is subsequently played.

In some embodiments, if the image sensor fuses images, a fused image may be input into the fusion module based on a single frame. In this case, the fusion module may not need to perform fusion processing on the images, or may not adjust an image size, but output the image to the image processor front-end based on a single frame for further processing.

The image processor front-end (image processor front-end) is configured to perform front-end processing on an image to obtain an initial preview image. The image processor front-end may specifically include a statistics collecting (STATS) module and a GTM module. The GTM module is configured to globally brighten a dark part of an image, to improve picture quality.

In some embodiments, an image output by the image processor front-end may be put into the following two transmission paths:

(1) One transmission path is transmission from the image processor front-end to the image processor back-end for back-end processing. The image processor back-end may include a local tone mapping (local tone mapping, LTM) module, and the LTM module is configured to locally brighten a dark part of an image. Afterwards, the image processor back-end continues to transmit an image processed by the back end to the sensing module, and the sensing module may obtain ambient brightness based on the image, and indicate the ambient brightness to the automatic exposure control AEC module. Then, the AEC module determines an exposure manner based on the ambient brightness, and indicates the image sensor to switch an exposure manner. Alternatively, the sensing module may obtain ambient brightness based on the image, determine an exposure manner based on the ambient brightness, and then indicate the exposure manner to the AEC module. Afterwards, the AEC module determines the exposure manner based on the ambient brightness, and indicates the image sensor to switch an exposure manner.

In some embodiments, a manner in which the sensing module obtains the ambient brightness based on the image may include: comprehensively determining the ambient brightness based on a current status of the image sensor, an exposure parameter, and brightness channel information of an image frame.

It should be noted that, although the AEC module may be configured to control an exposure manner, the AEC module of the system does not have an enabling condition for determining the SHDR exposure manner and the DXG exposure manner, but needs to determine the SHDR exposure manner and the DXG exposure manner in combination with an ambient brightness detection result of the sensing module. When the ambient brightness is greater than X, the SHDR exposure manner is used; and when the ambient brightness is less than Y, the DXG exposure manner is used. X and Y may be set based on an actual requirement. To prevent ping-pong, a dual-threshold design may be used, that is, X is greater than Y, for example, X=500 lux and Y=300 lux.

(2) The other transmission path is transmission from the image processor front-end to the multi-camera smooth switching module. The multi-camera smooth switching module is configured to implement, by using the multi-camera smooth switching algorithm (for example, a SAT (spatial alignment transform) algorithm), a process of smoothly switching one camera to another camera image. After performing smooth image switching, the multi-camera smooth switching module may transmit a processed image to the image processor back-end. The image processor back-end may locally brighten a dark part of an image by using the LTM module included in the image processor back-end. Afterwards, a preview video image may be output based on a specific frame rate (for example, 30 fps), or a video-type (video) file is generated and stored based on a specific frame rate (for example, 30 fps).

It should be understood that, for a process in which the image processor front-end and the image processor back-end respectively perform front-end processing and back-end processing on an image, refer to an existing procedure. Details are not described herein.

It should be noted that, in this embodiment of this application, a smooth switching operation performed by the multi-camera smooth switching module is mainly used to implement switching between images respectively shot by an HDR camera and a non-HDR camera. Specifically, when there is switching between the HDR camera and the non-HDR camera in a video shooting process, the multi-camera smooth switching module may be configured to smoothly switch an image of the HDR camera to an image of the non-HDR camera, or smoothly switch an image of the non-HDR camera to an image of the HDR camera, that is, implement smooth switching between images collected by two different types of cameras, so as to ensure smooth video playing to avoid an image picture jump caused by direct switching.

It should be further noted that, the HDR camera in this embodiment of this application may be a primary camera, and the non-HDR camera may be a non-primary camera, such as a wide-angle camera. Optionally, the HDR camera and the non-HDR camera in this embodiment of this application may not specifically refer to two different cameras, but may refer to a camera that uses an HDR mode and a camera that does not use the HDR mode. For example, when a camera uses an HDR solution to collect an image, the camera is considered as the HDR camera; and when a camera does not use the HDR solution to collect an image, the camera is considered as the non-HDR camera.

Figure 8:
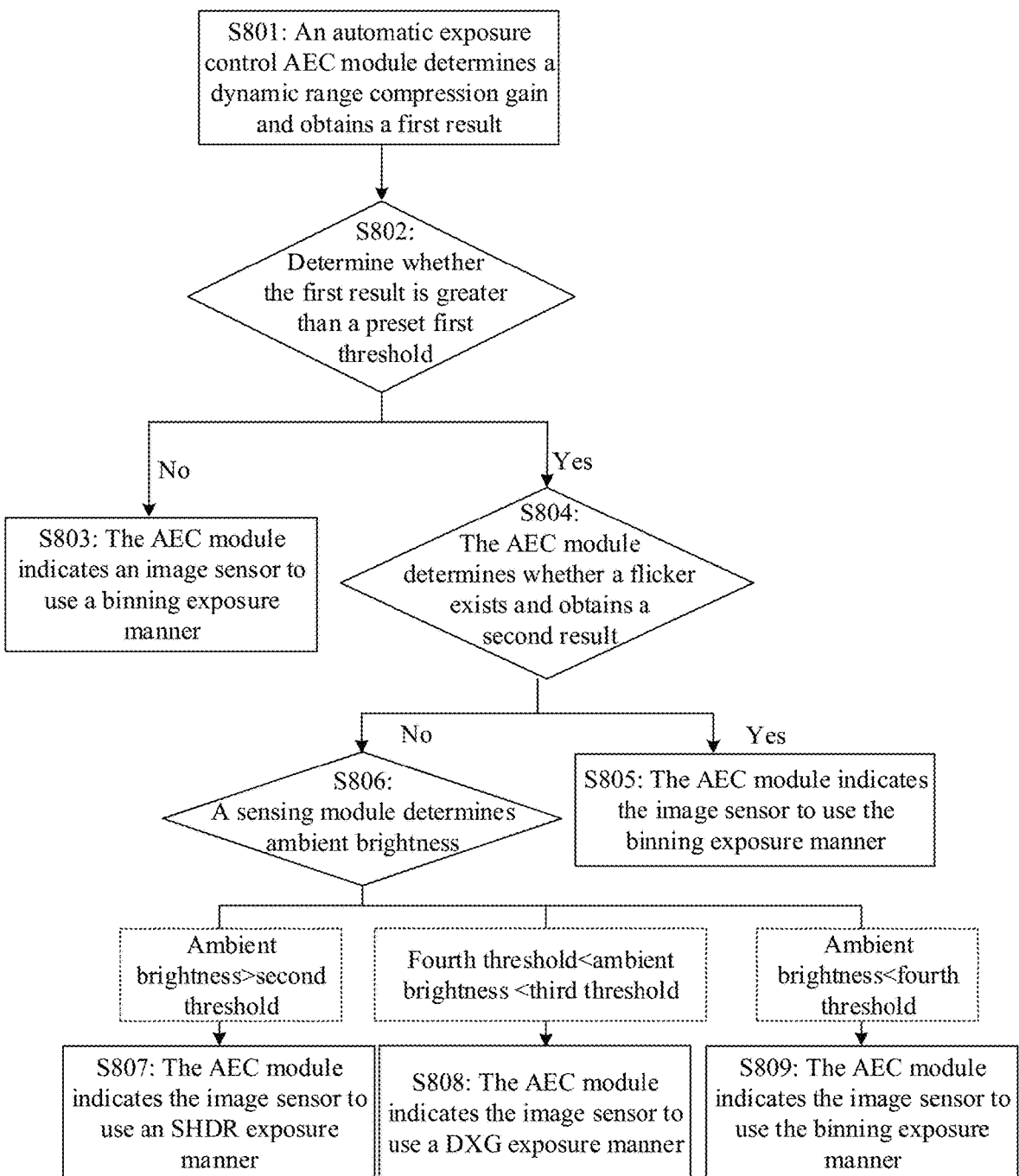
FIG. 8 is a schematic diagram of another video processing method according to an embodiment of this application.

For example, FIG. 8 is a schematic flowchart of a video processing method according to an embodiment of this application. The method may be performed by the electronic device 100 described above, and may be specifically implemented by functional modules in the electronic device. The method may include the following steps.

S801: The AEC module determines dynamic range information and obtains a first result.

The dynamic range information herein may be a dynamic range or a dynamic range compression gain. The dynamic range compression gain may be obtained through calculation based on a dynamic range of a current image and a preset standard dynamic range.

In some embodiments, before step S801 is performed, the video processing method provided in this embodiment of this application may further include: When receiving a first operation that is used to enable shooting and that is input by a user, in response to the first operation, the AEC module of the electronic device may indicate the image sensor to capture an image in a default exposure manner. After obtaining the image captured by the image sensor, the AEC module may obtain a dynamic range of the current image by using a histogram. For a specific process of obtaining the dynamic range of the current image based on the histogram, refer to an existing procedure. Details are not described in this embodiment of this application.

In some embodiments, in a video shooting process, as the image sensor captures increasingly more frames of images, the AEC module may obtain a current dynamic range based on a plurality of frames of images, for example, obtain an average dynamic range based on a histogram corresponding to each frame of image.

S802: Determine whether the first result is greater than a preset first threshold.

The first threshold may be flexibly set based on an actual situation. This is not limited in this embodiment of this application.

In some embodiments, a level of a current dynamic range may be determined based on a correlation relationship between the first result and the first threshold. For example, when the first result is greater than the first threshold, it indicates that a brightness difference of a current shot picture is relatively large, and the current dynamic range may be determined as a high dynamic range; and when the first result is not greater than the first threshold, it indicates that the brightness difference of the current shot picture is relatively small, and the current dynamic range may be determined as a medium/low dynamic range.

It should be noted that different dynamic ranges may correspond to different exposure manners. For example, when a dynamic range is a high dynamic range, it is determined that an exposure manner is Binning; or when a dynamic range is a medium/low dynamic range, an exposure manner needs to be further determined based on a flicker condition, ambient brightness, and a preset determining manner.

S803: When the first result is not greater than the first threshold, the AEC module indicates the image sensor to use a Binning exposure manner.

S804: When the first result is greater than the first threshold, the AEC module determines whether a flicker exists in an image, and obtains a second result.

S805: When the second result indicates that the flicker exists, the AEC module indicates the image sensor to use the Binning exposure manner.

In some embodiments, in a video shooting process, because an alternating current is used in all devices, a flicker may exist in a shot picture. It may be determined, based on a flicker result, whether to use the Binning exposure manner. When a flicker exists, it is determined that the Binning exposure manner is to be used; or when no flicker exists, an SHDR exposure manner or a DXG exposure manner may be further determined based on ambient brightness.

It should be noted that exposure time corresponding to the Binning exposure manner in this embodiment of this application may be greater than or equal to an alternating current cycle. For example, when an alternating current frequency is 50 Hz, the exposure time of the Binning exposure manner may be 10 ms.

S806: When the second result indicates that no flicker exists, the sensing module determines ambient brightness.

In some embodiments, the sensing module may obtain the image captured by the image sensor, and obtain the ambient brightness based on the image.

S807: When the ambient brightness is greater than a second threshold, the AEC module indicates the image sensor to use the SHDR exposure manner.

The second threshold may be flexibly set based on an actual situation. This is not limited in this embodiment of this application.

S808: When the ambient brightness is less than a third threshold and greater than a fourth threshold, the AEC module indicates the image sensor to use the DXG exposure manner.

The third threshold is less than the second threshold. The third threshold and the fourth threshold may be flexibly set based on an actual situation. This is not limited in this embodiment of this application.

S809: When the ambient brightness is less than the fourth threshold, the AEC module indicates the image sensor to use the Binning exposure manner.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting situation and a picture quality requirement, thereby effectively expanding a dynamic range in a video recording scenario and improving image picture quality in the video recording scenario.

It should be noted that in some other embodiments, if the image sensor of the electronic device does not support some exposure manners (for example, DXG), in the video processing method provided in this embodiment of this application, switching may alternatively be performed based on the SHDR exposure manner and the Binning exposure manner. In this case, exposure manners corresponding to different influence factors may be shown in Table 2.

TABLE 2

| Influence factor | Exposure manner |
|---|---|
| High ambient brightness + high dynamic range | SHDR |
| Medium/low ambient brightness + high dynamic range | Binning |
| Low dynamic range | Binning |
| Flicker phenomenon exists | Binning |
| Thermal escape phenomenon exists | Binning |

Alternatively, in still other embodiments, if the image sensor of the electronic device does not support some exposure manners (for example, SHDR), in the video processing method provided in this embodiment of this application, switching may alternatively be performed based on the DCG exposure manner and the Binning exposure manner. In this case, exposure manners corresponding to different influence factors may be shown in Table 3.

TABLE 3

| Influence factor | Exposure manner |
|---|---|
| High ambient brightness + high dynamic range | DCG |
| Medium/low ambient brightness + high dynamic range | DCG |
| Low dynamic range | Binning |
| Influence factor | Exposure manner |
| Thermal escape phenomenon exists | Binning |

When switching is performed between different exposure manners, a seamless switching effect can be implemented. A specific implementation means for implementing the seamless switching effect is described in detail in the following, and details are not described herein.

Figure 9A:
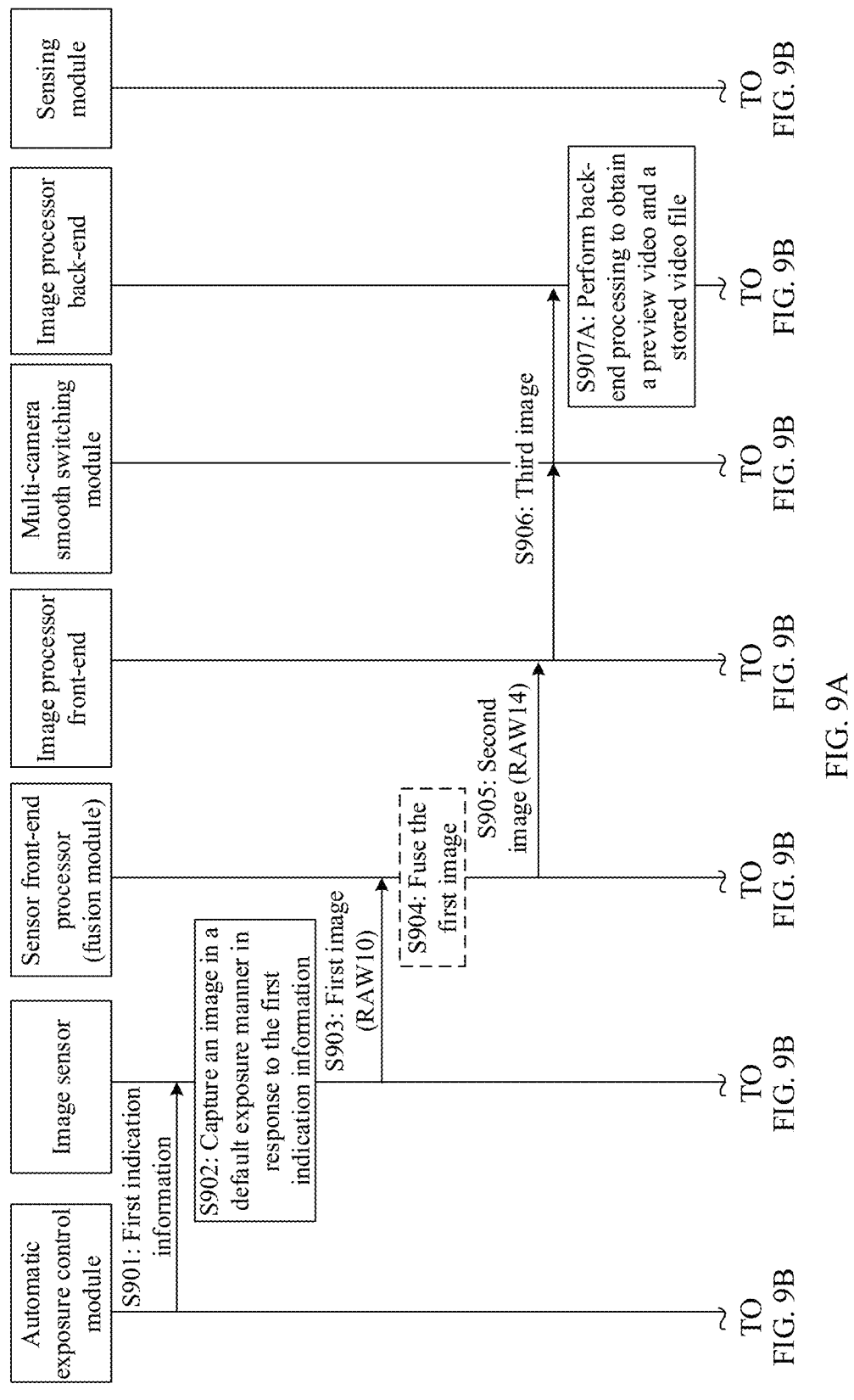
FIG. 9A and FIG. 9B are a schematic diagram of still another video processing method according to an embodiment of this application.
Figure 9B:
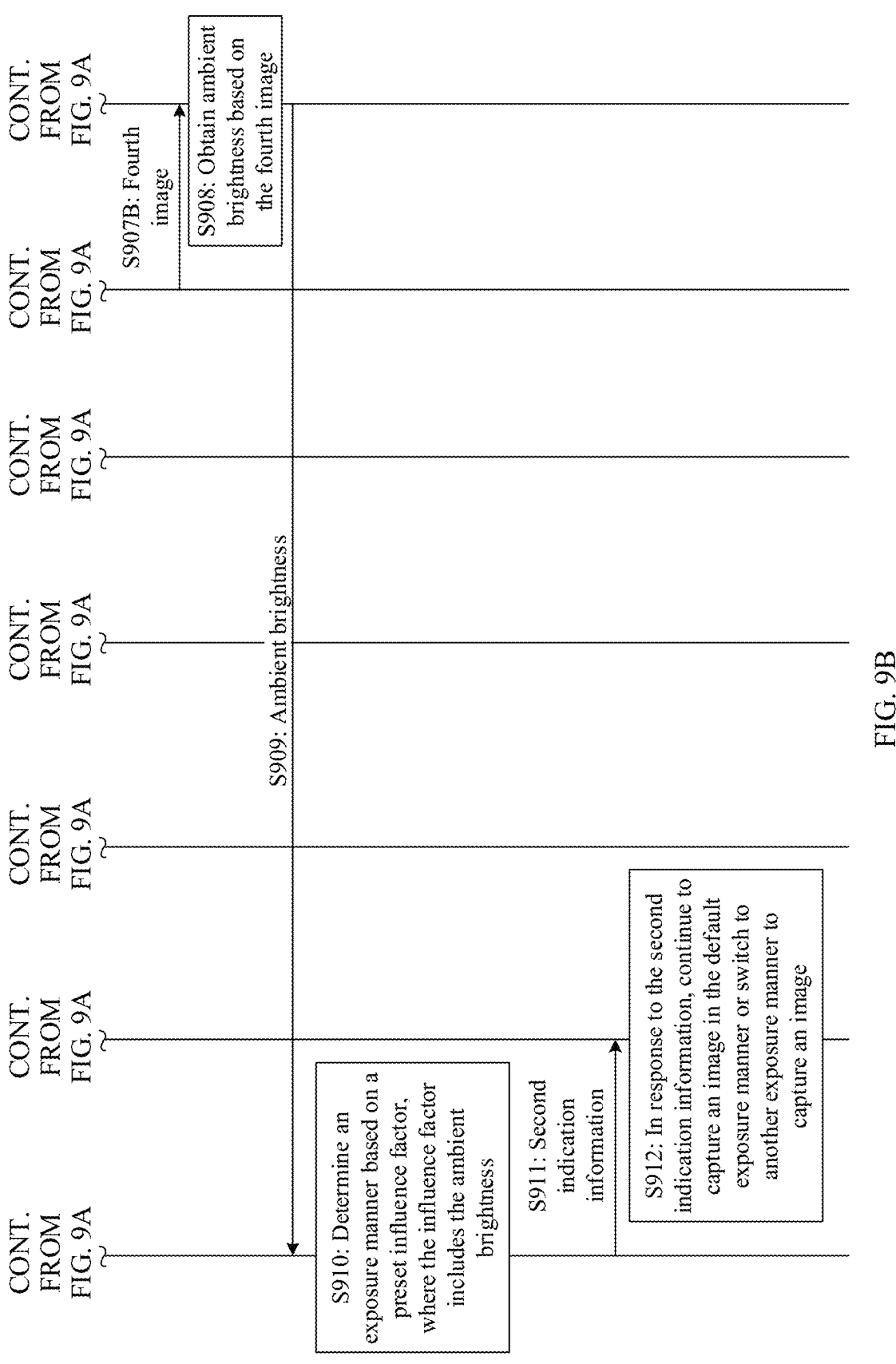

For example, FIG. 9A and FIG. 9B are a schematic flowchart of another video processing method according to an embodiment of this application. FIG. 9A and FIG. 9B show a process of interaction between functional modules, and the process may specifically include the following steps.

S901: The automatic exposure control module sends first indication information to the image sensor.

In some embodiments, the automatic exposure control module may preset a default exposure manner, and the default exposure manner may be, for example, Binning.

In some embodiments, before step S901 is performed, the video processing method provided in this embodiment of this application may further include: When receiving a first operation that is used to enable shooting and that is input by a user, in response to the first operation, the AEC module of the electronic device may indicate the image sensor to capture an image in the default exposure manner. For example, the first operation may be used to enable video recording, for example, may be an operation of tapping a recorded image in the camera main interface shown in FIG. 6C.

S902: The image sensor captures an image in the default exposure manner in response to the first indication information.

It should be noted that in this embodiment of this application, the image sensor is only configured to collect a raw image, such as an image in a RAW10 format, without performing fusion processing on the image or adjusting an image size.

S903: The image sensor sends the first image to the fusion module.

The first image may be a raw image collected by the image sensor, such as an image in the RAW10 format.

Optionally, when the default exposure manner is that an image in a dual-frame mode is captured in an exposure manner such as an SHDR or a DXG, step S904 may be further performed, that is, the fusion module performs multi-frame fusion on the first image. When the image sensor captures an image in a single-frame mode in the Binning exposure manner, the image may be input to the fusion module in the single-frame mode. In this case, the fusion module does not need to perform fusion processing, and may only adjust an image parameter.

S905: The fusion module sends a second image to the image processor front-end.

The second image may be an image processed by the fusion module, and the fusion module may be configured to perform fusion processing on the obtained image, or may adjust an image size by using a part.

S906: The image processor front-end sends a third image to the image processor back-end.

The third image may be an image obtained after the image processor front-end performs front-end processing on the second image.

In some embodiments, after performing front-end processing on the image, the image processor front-end may output the third image based on two transmission procedures. One transmission procedure is as follows: The third image is transmitted to the multi-camera smooth switching module, and then the multi-camera smooth switching module transmits the third image to the image processor back-end. After receiving the image, the image processor back-end may perform the following step S907A. The other transmission procedure is as follows: The third image is transmitted to the image processor back-end, and then the image processor back-end sends the image to the sensing module, that is, performs the following step S907B.

S907A: The image processor back-end performs back-end processing to obtain a preview video and a stored video file.

S907B: The image processor back-end sends a fourth image to the sensing module.

The fourth image may be an image obtained after the image processor performs back-end processing on the third image.

S908: The sensing module obtains ambient brightness based on the fourth image.

S909: The sensing module sends the ambient brightness to the automatic exposure control module.

S910: The automatic exposure control module determines an exposure manner based on a preset influence factor, where the influence factor includes the ambient brightness.

S911: The automatic exposure control module sends second indication information to the image sensor.

The second indication information is used to indicate the image sensor to capture an image in a target exposure manner.

S912: The image sensor continues to use the target exposure manner or another exposure manner in response to the second indication information.

After collecting a raw image (for example, a RAW10 image) in the target exposure manner, the image sensor may determine an exposure manner in real time based on the foregoing steps S903 to S911, and capture an image in the target exposure manner and process the image.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

It should be noted that in the video processing method provided in this embodiment of this application, when the image sensor has a function of fusing images and adjusting an image size, the image sensor may perform an operation of fusing a plurality of frames of images in the DXG exposure manner and adjusting an image size. The following describes a video processing process in the manner with reference to the accompanying drawings.

Figure 10:
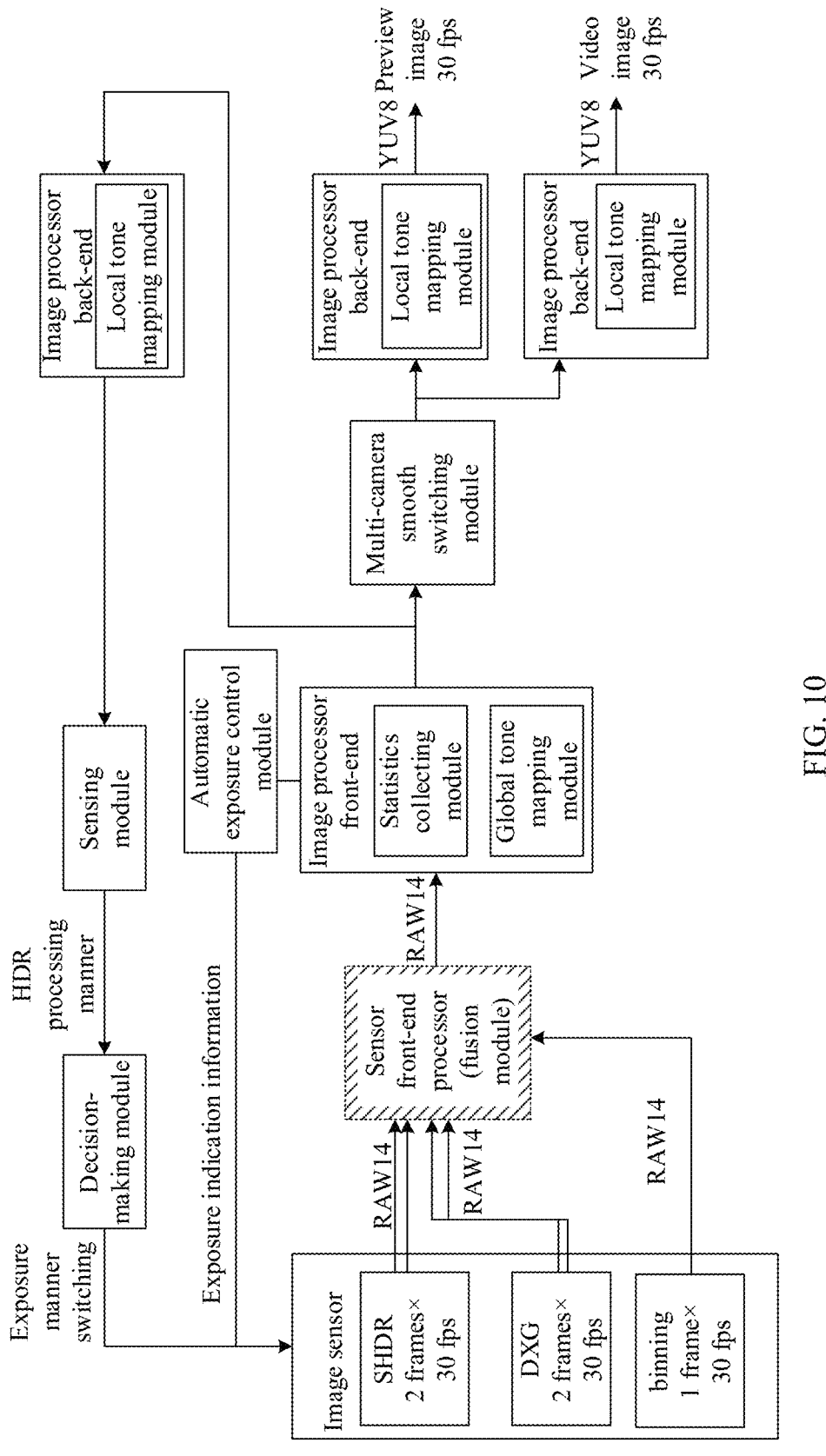
FIG. 10 is a schematic diagram of still another video processing method according to an embodiment of this application.

For example, FIG. 10 is a schematic diagram of data flow interaction between related modules during implementation of another video processing method according to an embodiment of this application.

In some embodiments, when video shooting is enabled, the automatic exposure control module may send exposure indication information to the image sensor, to indicate the image sensor to capture an image in a default exposure manner (for example, a Binning exposure manner). The image sensor collects images (such as RAW10) in the default exposure manner, fuses the images (in a DXG or SHDR exposure manner) and adjusts an image parameter (such as an image size or a bit depth), and then outputs an image (such as RAW14) to the fusion module. The fusion module transparently transmits the obtained image to the image processor front-end, and after performing front-end processing on the image, the image processor front-end outputs an image based on two transmission paths: (1) One transmission path is as follows: The image processor front-end transmits the image to the image processor back-end. The image processor back-end may perform back-end processing on the image, and then transmits an image to the sensing module. The sensing module may obtain ambient brightness based on the image, and transmit the ambient brightness to a decision-making module. The decision-making module is configured to determine a target exposure manner based on the ambient brightness, where the target exposure manner is an exposure manner that matches an actual situation such as a current dynamic range, a flicker status, and ambient brightness. Then, the decision-making module sends exposure manner indication information to the image sensor, to indicate the image sensor to switch to the target exposure manner. (2) The other transmission path is as follows: The image processor front-end transmits the image to the multi-camera smooth switching module. Optionally, the multi-camera smooth switching module may implement smooth switching from one camera to another camera image by using a multi-camera smooth switching algorithm. After performing smooth image switching, the multi-camera smooth switching module may transmit a processed image to the image processor back-end. Then, the image processor back-end may locally brighten a dark part of the image by using the LTM module included in the image processor back-end, and then may output a preview video image based on a specific frame rate (for example, 30 fps), or generate and store a video-type (vedio) file based on a specific frame rate (for example, 30 fps).

It should be understood that, for a process in which the image processor front-end and the image processor back-end respectively perform front-end processing and back-end processing on an image, refer to an existing procedure. Details are not described herein.

It should be noted that, in this embodiment of this application, a smooth switching operation performed by the multi-camera smooth switching module is mainly used to implement switching between images respectively shot by an HDR camera and a non-HDR camera. Specifically, when there is switching between the HDR camera and the non-HDR camera in a video shooting process, the multi-camera smooth switching module may be configured to smoothly switch an image of the HDR camera to an image of the non-HDR camera, or smoothly switch an image of the non-HDR camera to an image of the HDR camera, that is, implement smooth switching between images collected by two different types of cameras, so as to ensure smooth video playing to avoid an image picture jump caused by direct switching.

It should be further noted that, the HDR camera in this embodiment of this application may be a main camera, and the non-HDR camera may be a non-main camera, such as a wide-angle camera. Optionally, the HDR camera and the non-HDR camera in this embodiment of this application may not specifically refer to two different cameras, but may refer to a camera that uses an HDR mode and a camera that does not use the HDR mode. For example, when a camera uses an HDR solution to collect an image, the camera is considered as the HDR camera; and when a camera does not use the HDR solution to collect an image, the camera is considered as the non-HDR camera.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

Figure 11A:
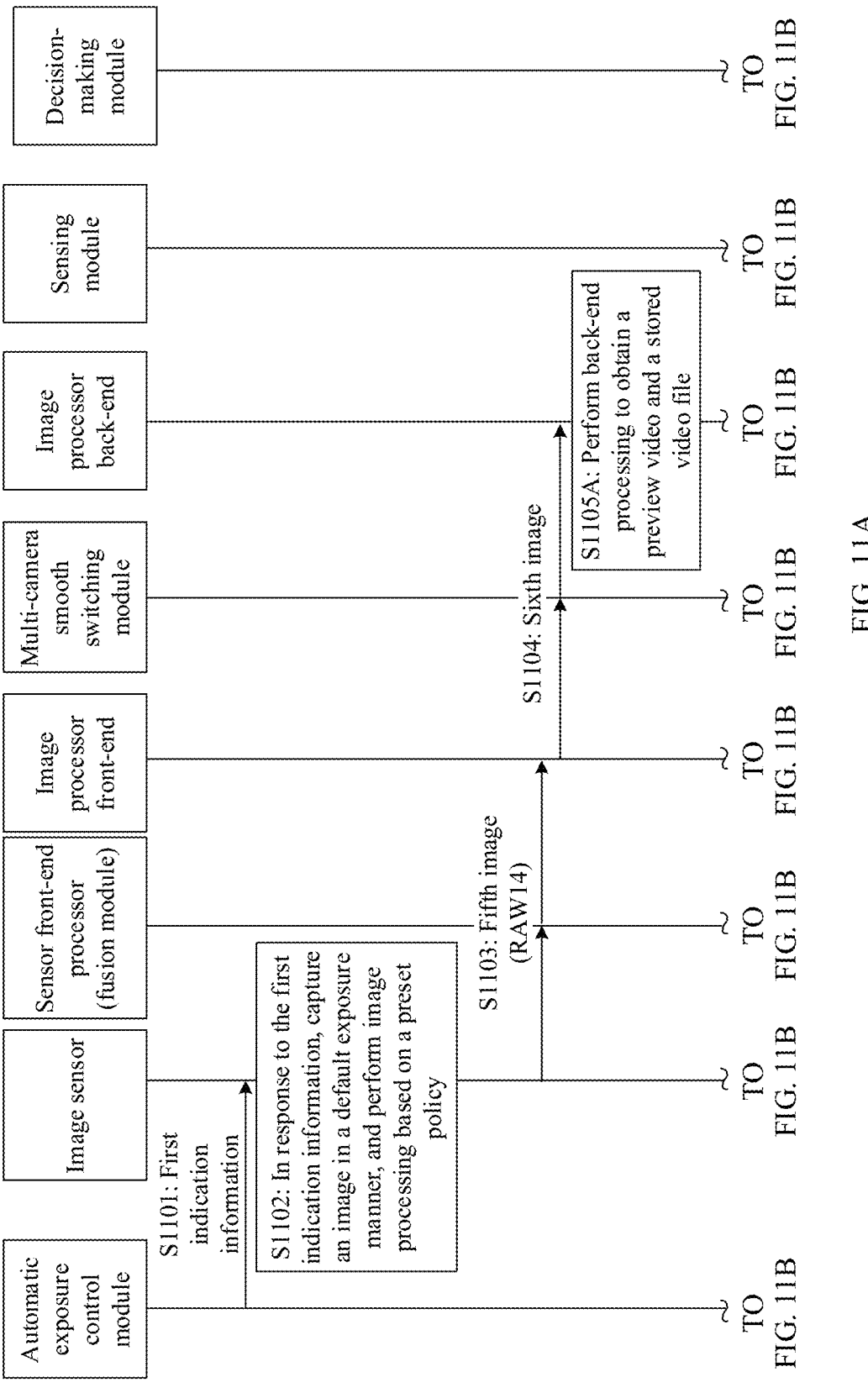
FIG. 11A and FIG. 11B are a schematic diagram of still another video processing method according to an embodiment of this application.
Figure 11B:
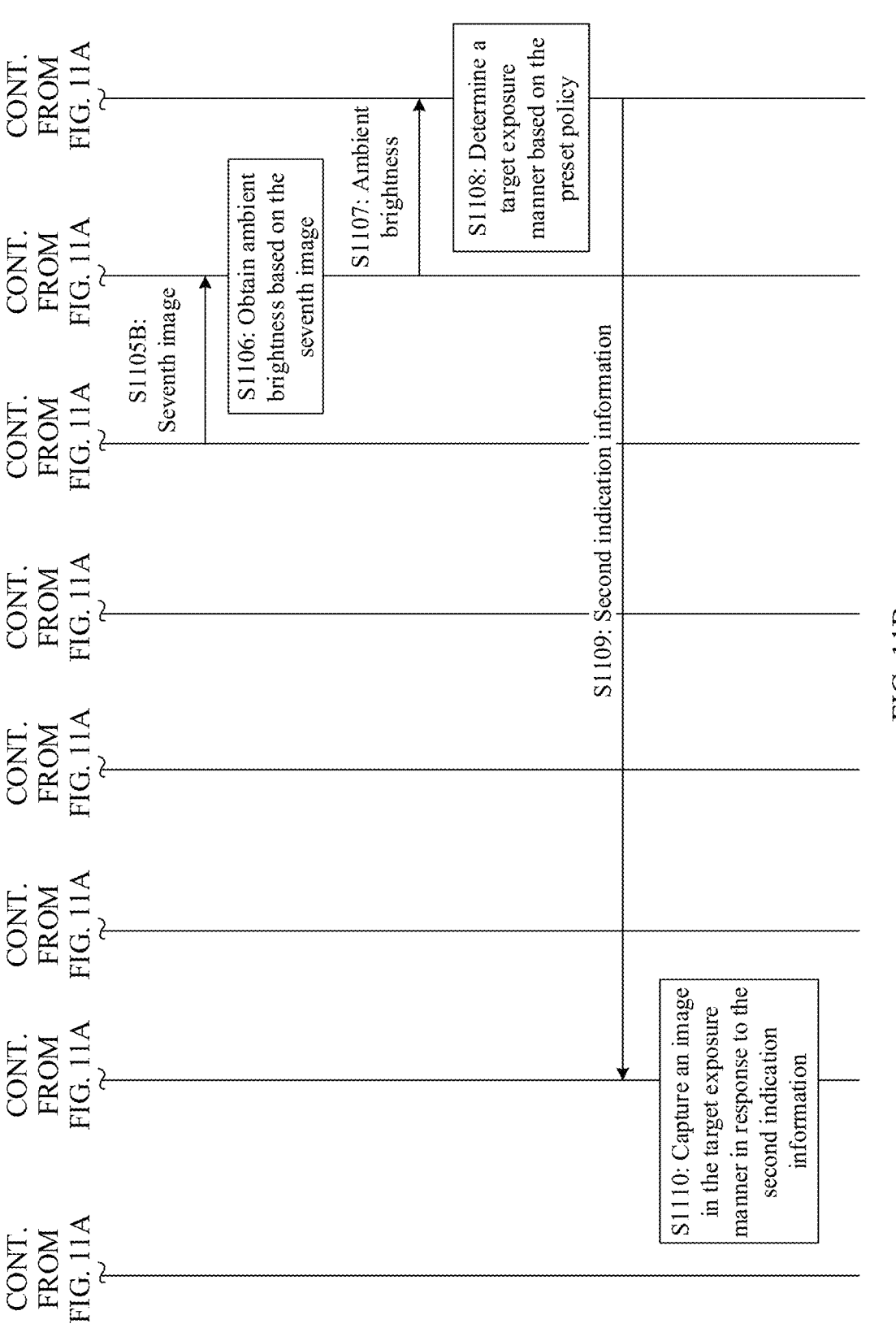

For example, FIG. 11A and FIG. 11B are a schematic flowchart of another video processing method according to an embodiment of this application. FIG. 11A and FIG. 11B show a process of interaction between functional modules, and the process may specifically include the following steps.

S1101: The automatic exposure control module sends first indication information to the image sensor.

In some embodiments, the automatic exposure module may preset a default exposure manner, and the default exposure manner may be, for example, Binning.

In some embodiments, before step S1101 is performed, the video processing method provided in this embodiment of this application may further include: When receiving a first operation that is used to enable shooting and that is input by a user, in response to the first operation, the AEC module of the electronic device may indicate the image sensor to capture an image in the default exposure manner. For example, the first operation may be used to enable video recording, for example, may be an operation of tapping a recorded image in the camera main interface shown in FIG. 6C.

S1102: The image sensor captures an image in the default exposure manner in response to the first indication information, and performs image processing based on a preset policy.

It should be noted that, different from the foregoing embodiment in FIG. 9A and FIG. 9B, the image sensor in this embodiment of this application may have a capability of fusing images and adjusting an image size, and can perform image processing based on the preset policy. For example, when the default exposure manner is that an image is obtained in a dual-frame module such as a DCG, a DAG, or a DXG, the image sensor may fuse a dual-frame first image. When the image sensor captures an image in a Binning exposure manner, the image is input to the fusion module in a single frame mode. In this case, the fusion module does not need to perform fusion processing, and may only adjust an image size.

For example, for ease of description, in this embodiment of this application, a manner that is in the image sensor and in which two frames of images are obtained in a DXG manner and are fused is denoted as iDXG. Referring to FIG. 11A and FIG. 11B, a manner in which the image sensor fuses dual frames of images may include: obtaining two frames of images with a preset photosensitivity ratio, and then fusing the two frames of images to obtain an image with a larger dynamic range. Due to a limitation of hardware performance of the image sensor, a photosensitivity ratio between two frames of images obtained in the iDXG manner may be preset, for example, may be set to several fixed values such as iDXG 1:4, iDXG 1:8, or iDXG 1:16.

Different switching conditions may correspond to different photosensitivity ratios. For example, a high dynamic scenario may correspond to iDXG 1:4 (that is, the iDXG exposure manner is used, and a photosensitivity ratio is 1:4); an extremely high dynamic scenario may correspond to iDXG 1:16 (that is, the iDXG exposure manner is used, and a photosensitivity ratio is 1:16); a medium/low dynamic scenario may correspond to the Binning exposure manner; and a thermal escape scenario may correspond to the Binning exposure manner.

The extremely high dynamic range, the high dynamic range, and the medium/low dynamic range may be divided based on a requirement, and each dynamic range is not specifically limited in this application.

Different from this, in the embodiment in FIG. 9A and FIG. 9B, when the fusion module performs dual-frame image fusion, a photosensitivity ratio between two frames of images may be flexibly set, and is not limited to several fixed values. Therefore, the fusion manner in the embodiment in FIG. 9A and FIG. 9B can conveniently adjust brightness of an image flexibly. However, the fusion manner in the embodiment in FIG. 11A and FIG. 11B can implement HDR processing on an image while ensuring performance of the image sensor.

S1103: The image sensor sends a fifth image to the image processor front-end.

Specifically, the image sensor may first transmit the fifth image to the fusion module, and then the fusion module transparently transmits the fifth image to the image processor front-end.

S1104: The image processor front-end sends a sixth image to the image processor back-end.

The sixth image may be an image obtained after the image processor front-end performs front-end processing on the fifth image.

In some embodiments, after performing front-end processing on the image, the image processor front-end may output the sixth image based on two transmission procedures. One transmission procedure is as follows: The sixth image is transmitted to the multi-camera smooth switching module, and then the multi-camera smooth switching module transmits the sixth image to the image processor back-end. After receiving the image, the image processor back-end may perform the following step S1105A. The other transmission procedure is as follows: The sixth image is directly transmitted to the image processor back-end, and then the image processor back-end sends the image to the sensing module, that is, performs the following step S1105B.

S1105A: The image processor back-end performs back-end processing to obtain a preview video and a stored video file.

S1105B: The image processor back-end sends a seventh image to the sensing module.

S1106: The sensing module obtains ambient brightness based on the seventh image.

S1107: The sensing module sends the ambient brightness to a decision-making module.

It should be noted that, the decision-making module herein may be an additionally disposed module, or may be a sub-module in the automatic exposure control module. This is not limited in this embodiment of this application.

S1108: The sensing module determines a target exposure manner based on a preset policy.

The preset policy is a policy for determining the target exposure manner based on a current dynamic range, whether a flicker exists, ambient brightness, and the like, and may correspond to the policy for determining the target exposure manner described in the foregoing embodiment in FIG. 8.

S1109: The decision-making module sends second indication information to the image sensor.

S1110: The image sensor captures an image in the target exposure manner in response to the second indication information.

After collecting a raw image (for example, a RAW10 image) in the target exposure manner, the image sensor may determine an exposure manner in real time based on the foregoing steps S1103 to S1109, and capture an image in the target exposure manner and process the image.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

In the video processing method provided in this embodiment of this application, during video shooting, mutual switching may be performed between an HDR mode and a non-HDR mode. The HDR mode is a video shooting mode in which processing is performed by using an HDR technology, and the non-HDR mode is a video shooting mode in which processing is not performed by using the HDR technology. Generally, a primary camera and a secondary camera of an electronic device are included in a logical camera (logical camera). The primary camera has an HDR capability, and the secondary camera may have another capability (such as an ultra-wide angle capability) but does not have the HDR capability. Therefore, when switching needs to be performed between the HDR mode and the non-HDR mode during video shooting, switching may be performed between the primary camera and the secondary camera to implement the switching.

Figure 12:
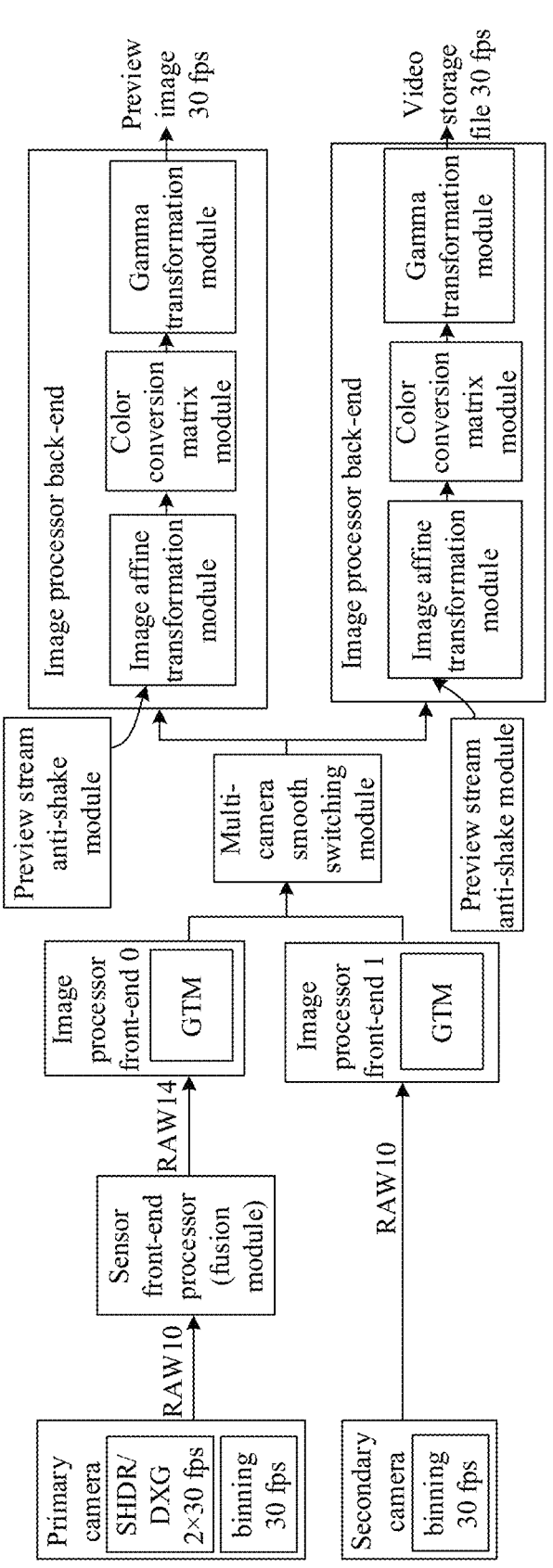
FIG. 12 is a schematic diagram of still another video processing method according to an embodiment of this application.

For example, FIG. 12 is a schematic flowchart of a video processing method in a scenario in which switching is performed between a primary camera and a secondary camera according to an embodiment of this application.

When switching is performed between the primary camera and the secondary camera, the following manners may be used to reduce image jumps.

(1) In a low dynamic scenario or in a scenario in which a flicker or a thermal escape phenomenon exists, a used exposure manner is Binning. In this case, a dynamic range gain of the system remains equal, and an image effect has no jump.

(2) In a high dynamic scenario in which no flicker or thermal escape phenomenon exists, the primary camera may capture an image in a target exposure manner determined in the manner described above. The secondary camera uses the Binning exposure manner and maintains a maximum dynamic range to be as close as possible to a dynamic range of the primary camera, to reduce image jumps.

Refer to FIG. 12. In some embodiments, the primary camera may capture an image in a plurality of exposure manners, including SHDR, DXG, and Binning exposure manners. After capturing the image, the primary camera may transmit the raw image (for example, a RAW10 image) to a fusion module. When the image is input to the fusion module in a dual-frame mode, the fusion module performs dual-frame image fusion, and transmits a fused image (a RAW14 image) to an image processor front-end 0.

The secondary camera may capture an image in the Binning exposure manner, and then transmit the captured raw image (such as a RAW image) to an image processor front-end 1.

The image processor front-end 0 and the image processor front-end 1 may transmit, to a multi-camera smooth switching module, images that are respectively processed by the image processor front-end 0 and the image processor front-end 1. The multi-camera smooth switching module may process, based on a multi-camera smooth switching algorithm, images corresponding to different cameras, to implement smooth switching between images collected by two different types of cameras, so as to ensure smooth video playing and avoid an image picture jump caused by direct switching.

Then, the fusion module may continue to transmit the image to an image processor back-end. The image processor back-end may perform anti-shake processing on the image by using a preview stream anti-shake module (for example, EIS2.0 and EIS3.0), and then perform further processing on the image by using an image affine transformation module, a color conversion matrix (CCM) module, and a Gamma (Gamma) transformation module. For a specific processing process, refer to an existing procedure and principle. Details are not described herein.

After processing is performed by the image processor back-end, a preview image with a specific frame rate (for example, 30 fps) and a video storage file with a specific frame rate (for example, 30 fps) may be obtained.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

In the video processing method provided in this embodiment of this application, a plurality of HDR capabilities may be supported, for example, an HDR10+ video capability may be supported, that is, an electronic device may record or play a video by using an HDR10+ technology. In some embodiments, the HDR10+ capability may be mainly applied to a back-end part of an image processor, including adjusting the color conversion matrix module to BT.2020, adjusting Gamma conversion to a PQ conversion curve, generating dynamic metadata, and so on. In other words, the HDR10+ technology may be used simultaneously with seamless switching between different exposure manners. For a path for switching between exposure manners by using the HDR10+ technology, refer to FIG. 9A and FIG. 9B. Details are not described herein again.

In some embodiments, when an electronic device supports a multi-state HDR capability, a corresponding switch control may be set. In addition, when the electronic device supports another HDR technology (using HDR10+ as an example), a switch control corresponding to HDR10+ may also be set. For an electronic device that does not support the multi-state HDR or HDR10+, a switch control corresponding to the multi-state HDR or HDR10+ on the electronic device may be set to be gray.

With reference to the accompanying drawings, a process of adjusting image parameters corresponding to different exposure manners is described below by using an example in which a bit depth is adjusted.

Figure 13:
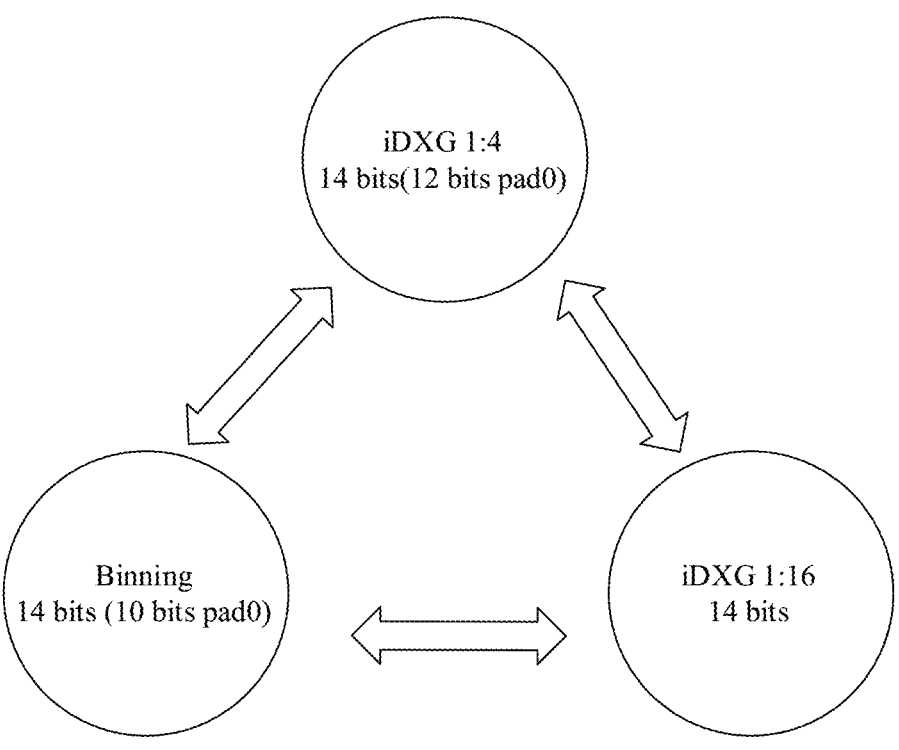
FIG. 13 is a schematic diagram in which an image parameter is adjusted in a video processing process according to an embodiment of this application.

For example, FIG. 13 is a schematic diagram of a manner of adjusting an image parameter according to an embodiment of this application.

In some embodiments, the manner of adjusting an image parameter may include: 0 is padded in a least significant bit in a Pad0 manner, so that images corresponding to different exposure manners have a same bit depth. For example, as shown in FIG. 13, for an image corresponding to an exposure manner of iDCG 1:4, 0 is padded in two least significant bits, where 1:4 is a photosensitivity ratio between two frames of images with different iDCG gains; and for an image corresponding to a Binning exposure manner, 0 is padded in four least significant bits. The images obtained in the iDCG and Binning exposure manners have a same bit depth after 0 is padded in the least significant bits.

Figure 14:
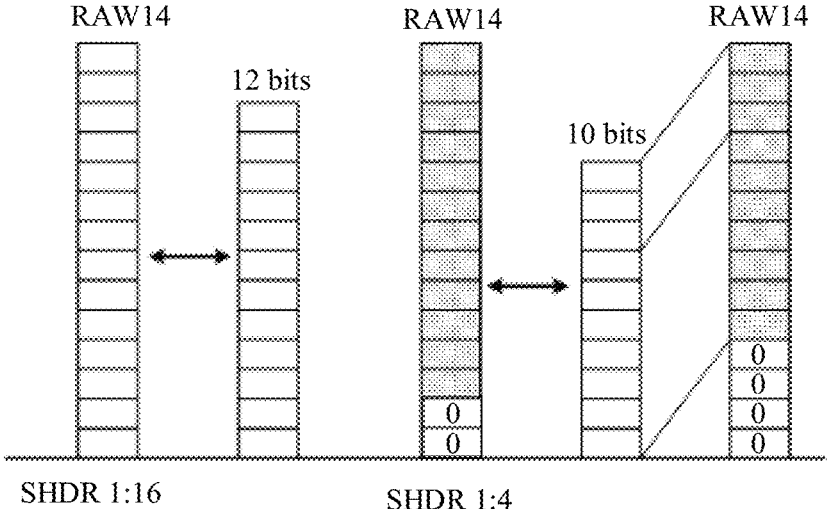
FIG. 14 is a schematic diagram in which an image parameter is adjusted in a video processing process according to an embodiment of this application.

For example, FIG. 14 is a schematic diagram of a manner of adjusting an image parameter according to an embodiment of this application.

In some embodiments, an image sensor that supports seamless switching between a plurality of exposure manners (for example, three exposure manners: Binning, a DXG, and an SHDR) may perform setting to unify a bit depth (bit depth), for example, unify the bit depth to RAW14. For an image whose bit depth is less than 14 bits, the bit depth may be unified to RAW14 through bit padding.

It should be noted that, in the video processing method provided in this embodiment of this application, a unified bit depth may be based on a bit depth of an iDXG image, because in several exposure manners provided in this application, a bit depth of an image corresponding to the iDXG exposure manner is largest. In actual application, when another exposure manner is used, the unified bit depth may be flexibly set based on a type of the exposure manner. This is not limited in this embodiment of this application.

For example, the unified bit depth is 14 bits. A manner of adjusting a bit depth may be shown in FIG. 13, and includes: An image captured through Binning exposure is changed from 10 bits to 14 bits through bit padding; two frames of fused images that are obtained in an iDXG exposure manner and whose photosensitivity ratio is 1:4 are changed from 12 bits to 14 bits through bit padding; and two frames of fused images that are obtained in the iDXG exposure manner and whose photosensitivity ratio is 1:16 have 14 bits, and in this case, there is no need to perform bit padding.

It should be further noted that, in the video processing method provided in this embodiment of this application, different exposure manners may correspond to different photosensitivity ratios. It should be noted that the photosensitivity ratio may be a combination of exposure time (exp) and a system gain (gain). A plurality of system gains may be set, for example, gain=1, gain=4, and gain=16.

It is assumed that there are currently three exposure manners: Binning, iDXG 1:4, and iDXG 1:16, and the three exposure manners correspond to different exposure time and system gains. In this case, the photosensitivity ratios corresponding to the different exposure manners may be obtained based on the exposure time and the system gain. For example, a principle of obtaining a photosensitivity ratio may include: (1) When a system dynamic range compression gain is 3.99 (that is, adrc gain=3.99), an exposure manner is a Binning mode, exposure time is a ms (exp=a ms), and a system gain is 1, a photosensitivity ratio obtained after the exposure time and the system gain are combined is 1. (2) When a system dynamic range compression gain is 4 (that is, adrc gain=4), an exposure manner is iDXG 1:4, exposure time is a ms (exp=a ms), and a system gain is 4, a photosensitivity ratio obtained after the exposure time and the system gain are combined is 4. (3) When a system dynamic range compression gain is 4 (that is, adrc gain=4), an exposure manner is iDXG 1:16, exposure time is a ms (exp=a ms), and a system gain is 16, a photosensitivity ratio obtained after the exposure time and the system gain are combined is 16. For example, a photosensitivity ratio corresponding to each exposure manner may be shown in Table 4.

TABLE 4

| Exposure manner | Photosensitivity ratio |
| --- | --- |
| Binning | 1 |
| iDXG 1:4 | 4 |
| iDXG 1:16 | 16 |

In different exposure manners, the AEC module may indicate the image sensor to capture an image by using a gain corresponding to the exposure manner. Therefore, images captured in different exposure manners may correspond to different photosensitivities. To avoid an image brightness jump that is between images corresponding to different exposure manners and that is caused by different photosensitivities when switching is performed between different exposure modes, in the video processing method provided in this embodiment of this application, a photosensitivity ratio corresponding to an exposure manner is adjusted to resolve the foregoing problem.

For example, the three exposure manners and the three photosensitivity ratios in Table 4 are used as examples. In Table 4, the photosensitivity ratio corresponding to the Binning exposure manner is 1, and the photosensitivity ratio corresponding to iDXG 1:4 is 4; and when an exposure manner is switched from Binning to iDXG 1:4, the photosensitivity ratio corresponding to iDXG 1:4 may be increased to be four times the original photosensitivity ratio. Alternatively, in Table 4, the photosensitivity ratio corresponding to the Binning exposure manner is 1, and the photosensitivity ratio corresponding to iDXG 1:16 is 16; and when an exposure manner is switched from Binning to iDXG 1:16, the iDXG 1:16 exposure manner may be increased to be 16 times the original. Alternatively, in the Table 4, the photosensitivity ratio corresponding to the iDXG 1:4 exposure manner is 4, and the photosensitivity ratio corresponding to iDXG 1:16 is 16; and when an exposure manner is switched from the iDXG 1:4 to iDXG 1:16, the iDXG 1:16 exposure manner may be increased to be four times the original. It should be noted that several photosensitivity ratios provided in Table 4 are merely examples. In actual application, photosensitivity ratios corresponding to different exposure manners may alternatively have other specific values. This is not limited in this embodiment of this application.

A photosensitivity of a corresponding image is adjusted during switching between different exposure manners, to avoid an image brightness jump, so that when switching is performed between different exposure manners, a video image can also be correspondingly smoothly switched, thereby ensuring picture quality.

For example, FIG. 15 is a schematic flowchart of still another video processing method according to an embodiment of this application. The method may include the following steps.

S1501: Receive a first operation input by a user, where the first operation is used to enable a video recording function of an electronic device.

The first operation may correspond to the foregoing operation of tapping a VIDEO button in FIG. 6C, or the first operation may correspond to an operation of performing a tap to enable a smart HDR function.

In some embodiments, after the video recording function is enabled, the electronic device may display a first interface. The first interface includes a first control, and the first control is configured to enable a function of automatically switching an HDR exposure manner. For example, the first interface may correspond to the interface shown in FIG. 6A or FIG. 6D.

S1502: Obtain a first image in a preset default high-dynamic range HDR exposure manner in response to the first operation.

In this embodiment of this application, exposure manners may include a Binning exposure manner, an SHDR exposure manner, a DXG exposure manner, and the like. The exposure manners may be divided into a first HDR exposure manner and a second HDR exposure manner based on a quantity of image frames corresponding to different exposure manners. The first HDR exposure manner is a single-frame mode, that is, one frame of image may be obtained based on one time of exposure, and the first HDR exposure manner may be a Binning mode. The second HDR exposure manner is a dual-frame mode, that is, two frames of images may be read based on one time of exposure, such as a DXG mode; or two times of exposure, that is, long exposure and short exposure, are performed to obtain two frames of images, such as an SHDR mode.

In some embodiments, the default HDR exposure manner may be preset. When receiving a first operation, an AEC module may indicate an image sensor to capture an image in the default HDR exposure manner. For example, the default HDR exposure manner may be, for example, the Binning mode.

S1503: Obtain ambient brightness based on the first image, and determine a target HDR exposure manner based on a preset policy, where the preset policy includes dynamic range information corresponding to video shooting, a flicker status, and a correspondence between the ambient brightness and the target HDR exposure manner.

Dynamic range information herein may include a dynamic range and/or a dynamic range compression gain. In this embodiment of this application, the dynamic range is used as an example for description.

In some embodiments, a manner of determining the target HDR exposure manner based on the preset policy may include: obtaining a dynamic range corresponding to the video shooting; when the dynamic range is less than a first threshold, determining that the target HDR exposure manner is the Binning mode; when the dynamic range is greater than or equal to the first threshold, detecting whether a flicker exists; when the flicker exists, determining that the target HDR exposure manner is the Binning mode; when no flicker exists, determining the target HDR exposure manner based on the ambient brightness; when the ambient brightness is greater than a second threshold, determining that the target HDR exposure manner is the SHDR mode; and when the ambient brightness is less than a third threshold and greater than a fourth threshold, determining that the target HDR exposure manner is the DXG mode, where the third threshold is less than the second threshold; and when the ambient brightness is less than the fourth threshold, determining that the target HDR exposure manner is the Binning mode.

It should be noted that, in addition to determining the exposure manner based on the dynamic range, the exposure manner may be determined based on the dynamic range compression gain. A process of determining the exposure manner based on the dynamic range compression gain is similar to the foregoing process (the dynamic range may be replaced with the dynamic range compression gain), and details are not described herein again. When the dynamic range is replaced with the dynamic range compression gain, a specific value of the first threshold may also change accordingly, that is, a specific value of the first threshold corresponding to the dynamic range may be different a specific value of the first threshold corresponding to the dynamic range compression gain.

In some embodiments, a manner of determining the target HDR exposure manner based on the preset policy may further include: detecting whether a thermal escape phenomenon exists in the video shooting; and when the thermal escape phenomenon exists, determining that the target HDR exposure manner is the Binning mode.

In some embodiments, when there is switching between an HDR camera and a non-HDR camera during the video shooting, the method further includes: when an exposure manner of the HDR camera is the first HDR exposure manner and an exposure manner corresponding to the non-HDR camera is the second HDR exposure manner during the switching, adjusting a first dynamic range gain corresponding to the first HDR exposure manner, so that the first dynamic range gain is closest to a second dynamic range gain corresponding to the second HDR exposure manner.

S1504: When the target HDR exposure manner is different from the default HDR exposure manner, switch the default HDR exposure manner to the target HDR exposure manner, and continue to perform the video shooting to obtain a second image.

In some embodiments, when the target HDR exposure manner is the second HDR exposure manner, images in the dual-frame mode are fused.

In some embodiments, when the target HDR exposure manner is the second HDR exposure manner, the image sensor transmits the images in the dual-frame mode to the fusion module, and a fusion module fuses the images in the dual-frame mode; or when the target HDR exposure manner is the second HDR exposure manner, the image sensor fuses the images in the dual-frame mode.

In some embodiments, when fusing the images in the dual-frame mode, the fusion module separately determines a target photosensitivity ratio between a dual-frame input image in the DCG mode and a dual-frame input image in the DAG mode based on a photosensitivity ratio required in the DXG mode; and separately performs corresponding superposition on the dual-frame input image in the DCG mode and the dual-frame input image in the DAG mode based on the target photosensitivity ratio, to obtain a superposed dual-frame input image that meets the photosensitivity ratio in the DXG mode.

In some embodiments, when fusing the images in the dual-frame mode, the image sensor superposes a dual-frame input image in the DCG mode and a dual-frame input image in the DAG mode based on a preset photosensitivity ratio. Using iDXG as an example, a photosensitivity ratio is, for example, 1:4 or 1:16.

In some embodiments, for images obtained in different exposure manners, image parameters respectively corresponding to these exposure manners may be adjusted to be consistent. A specific process may include: presetting a target parameter corresponding to an image obtained through the video shooting; and adjusting, to the target parameter, an initial parameter corresponding to the first image obtained in the first HDR exposure manner; and/or adjusting, to the target parameter, an initial parameter corresponding to the second image obtained in the second HDR exposure manner.

In some embodiments, the electronic device supports the first HDR video mode, and the first HDR video mode includes HDR10 or HDR10+.

According to the video processing method provided in this embodiment of this application, seamless switching is performed between a plurality of types of HDR processing solutions based on a change in factors such as ambient brightness, a required dynamic range, and flicker detection, so that image processing can be performed by using an HDR solution that adapts to an actual shooting environment and a picture quality requirement, thereby effectively expanding a dynamic range in a video recording scenario and improving image picture quality in the video recording scenario.

Based on a same technical idea, an embodiment of this application further provides an electronic device, including one or more processors and one or more memories. The one or more memories store one or more computer programs, and the one or more computer programs include instructions. When the instructions are executed by the one or more processors, a computer or the processor is enabled to perform one or more steps in any one of the foregoing methods.

Based on a same technical idea, an embodiment of this application further provides a computer-readable storage medium. The computer-readable storage medium stores computer-executable program instructions. When the computer-executable program instructions are run on a computer, the computer or a processor is enabled to perform one or more steps in any one of the foregoing methods.

Based on a same technical idea, an embodiment of this application further provides a computer program product including instructions. The computer program product includes computer program code. When the computer program code is run on a computer, the computer or a processor is enabled to perform one or more steps in any one of the foregoing methods.

All or some of the foregoing embodiments may be implemented by using software, hardware, firmware, or any combination thereof. When the software is used for implementation, some or all of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the procedures of the methods in the foregoing embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, for example, a ROM, a random access memory RAM, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

The invention claimed is:

1. A video processing method, applied to an electronic device, wherein the method comprises:

receiving a first operation input by a user, wherein the first operation is used to enable a video recording function of the electronic device;

obtaining a first image in a preset default high-dynamic range (HDR) exposure manner in response to the first operation;

obtaining ambient brightness based on the first image, and determining a first target HDR exposure manner based on a preset policy, wherein the preset policy comprises a plurality of target HDR exposure manners corresponding to a plurality of scenarios, the plurality of scenarios comprise dynamic range information corresponding to video shooting, a flicker status, and at least one correspondence between ambient brightness information and at least one target HDR exposure manner, and the plurality of target HDR exposure manners comprises at least one single frame mode manner and a plurality of dual frame mode manners, the at least one single frame mode manner comprises a binning mode manner, the plurality of dual frame mode manners comprises a stagger high-dynamic range (SHDR) mode manner and a DXG mode manner, and wherein the DXG mode manner is a mode manner in which a dual conversion gain (DCG) mode manner and a dual analog gain (DAG) mode manner are used in superposition; and when the first target HDR exposure manner is different from the default HDR exposure manner, switching the default HDR exposure manner to the first target HDR exposure manner, and continuing to perform the video shooting to obtain a second image.

2. The method according to claim 1, wherein the method further comprises: fusing images in a first dual frame mode manner of the plurality of dual frame mode manners when the first target HDR exposure manner is the first dual frame mode manner of the plurality of dual frame mode manners.

3. The method according to claim 2, wherein the electronic device comprises an automatic exposure control (AEC) module, an image sensor, a sensing module, and a fusion module; and that images input in the first dual frame mode are fused when the first target HDR exposure manner is the first dual frame mode manner of the plurality of dual frame mode manners specifically comprises:

when the first target HDR exposure manner is the first dual frame mode manner of the plurality of dual frame mode manners, transmitting, by the image sensor, the images in the first dual frame mode manner to the fusion module; and fusing, by the fusion module, the images in the first dual frame mode manner; or when the target HDR exposure manner is the first dual frame mode manner of the plurality of dual frame mode manners, fusing, by the image sensor, the images in the first dual frame mode manner.

4. The method according to claim 3, wherein when fusing the images in the first dual frame mode manner, the fusion module;

separately determines a target photosensitivity ratio between a dual-frame input image in the DCG mode manner and a dual-frame input image in the DAG mode manner based on a photosensitivity ratio required in the DXG mode manner; and separately performs corresponding superposition on the dual-frame input image in the DCG mode manner and the dual-frame input image in the DAG mode manner based on the target photosensitivity ratio, to obtain a superposed dual-frame input image that meets the photosensitivity ratio in the DXG mode manner.

5. The method according to claim 3, wherein when fusing the images in the first dual frame mode manner, the image sensor superposes a dual-frame input image in the DCG mode manner and a dual-frame input image in the DAG mode manner based on a preset photosensitivity ratio.

6. The method according to claim 1, wherein the method further comprises:

presetting a target parameter corresponding to an image obtained through the video shooting; and adjusting, to the target parameter, an initial parameter corresponding to the first image obtained in the at least one single frame mode manner; and/or adjusting, to the target parameter, an initial parameter corresponding to the second image obtained in the a first dual frame mode manner of the plurality of dual frame mode manners.

7. The method according to claim 1, wherein the electronic device comprises an automatic exposure control (AEC) module, an image sensor, and a sensing module; and the obtaining a first image in a preset default HDR exposure manner in response to the first operation specifically comprises:

sending, by the AEC module, first indication information to the image sensor in response to the first operation, wherein the first indication information is used to indicate to capture an image in the default HDR exposure manner; and obtaining, by the image sensor, the first image in the default HDR exposure manner in response to the first indication information.

8. The method according to claim 1, wherein the electronic device comprises an automatic exposure control (AEC) module, an image sensor, and a sensing module; and the obtaining ambient brightness based on the first image, and determining a first target HDR exposure manner based on a preset policy specifically comprises:

sending, by the image sensor, the first image to the sensing module;

obtaining, by the sensing module, the ambient brightness based on the first image, and indicating the ambient brightness to the AEC module; and determining, by the AEC module, the first target HDR exposure manner based on the ambient brightness and the preset policy.

9. The method according to claim 1, wherein the determining a first target HDR exposure manner based on a preset policy specifically comprises:

obtaining a dynamic range corresponding to the video shooting;

when the dynamic range information is less than a first threshold, determining that the first target HDR exposure manner is the Binning mode manner;

when the dynamic range information is greater than or equal to the first threshold, detecting whether a flicker exists;

when the flicker exists, determining that the first target HDR exposure manner is the Binning mode manner;

when no flicker exists, determining the first target HDR exposure manner based on the ambient brightness;

when the ambient brightness is greater than a second threshold, determining that the first target HDR exposure manner is the SHDR mode manner;

when the ambient brightness is less than a third threshold and greater than a fourth threshold, determining that the first target HDR exposure manner is the DXG mode manner, wherein the third threshold is less than the second threshold; and when the ambient brightness is less than the fourth threshold, determining that the first target HDR exposure manner is the Binning mode manner.

10. The method according to claim 9, wherein the method further comprises:

detecting whether a thermal escape phenomenon exists in the video shooting; and wherein the preset policy further comprises when the thermal escape phenomenon exists, determining that the first target HDR exposure manner is the Binning mode manner.

11. The method according to claim 1, wherein the electronic device supports a first HDR video mode, wherein the first HDR video mode comprises an HDR10 standard or an HDR10 plus (HDR10+) standard.

12. The method according to claim 1, wherein when there is switching between an HDR camera and a non-HDR camera during the video shooting, the method further comprises:

when an exposure manner of the HDR camera is the at least one single frame mode manner and an exposure manner corresponding to the non-HDR camera is the a first dual frame mode manner of the plurality of dual frame mode manners during the switching, adjusting a first dynamic range gain corresponding to the at least one single frame mode manner, so that the first dynamic range gain is closest to a second dynamic range gain corresponding to the first dual frame mode manner.

13. The method according to claim 1, wherein the method further comprises:

displaying a first interface, wherein the first interface comprises a first control, and the first control is configured to enable a function of automatically switching the HDR exposure manner.

14. An electronic device, comprising:
one or more processors; and
one or more memories, wherein
the one or more memories store one or more computer programs, the one or more computer programs comprise instructions, and when the instructions are executed by the one or more processors, the electronic device is enabled to perform:
receiving a first operation input by a user, wherein the first operation is used to enable a video recording function of the electronic device;
obtaining a first image in a preset default high-dynamic range (HDR) exposure manner in response to the first operation;
obtaining ambient brightness based on the first image, and determining a first target HDR exposure manner based on a preset policy, wherein the preset policy comprises a plurality of target HDR exposure manners corresponding to a plurality of scenarios, the plurality of scenarios comprise dynamic range information corresponding to video shooting, a flicker status, and at least one correspondence between ambient brightness information and at least one target HDR exposure manner, and the plurality of target HDR exposure manners comprises at least one single frame mode manner and a plurality of dual frame mode manners, the at least one single frame mode manner comprises a binning mode manner, the plurality of dual frame mode manners comprises a stagger high-dynamic range (SHDR) mode manner and a DXG mode manner, and wherein the DXG mode manner is a mode manner in which a dual conversion gain (DCG) mode manner and a dual analog gain (DAG) mode are used in superposition; and
when the first target HDR exposure manner is different from the default HDR exposure manner, switching the default HDR exposure manner to the first target HDR exposure manner, and continuing to perform the video shooting to obtain a second image.

15. The electronic device according to claim 14, wherein the electronic device is further enabled to perform:
fusing images in a first dual frame mode manner of the plurality of dual frame mode manners when the target HDR exposure manner is the first dual frame mode manner of the plurality of dual frame mode manners.

16. The electronic device according to claim 15, wherein the electronic device is further enabled to perform:
presetting a target parameter corresponding to an image obtained through the video shooting; and
adjusting, to the target parameter, an initial parameter corresponding to the first image obtained in the at least one single frame mode manner; and/or
adjusting, to the target parameter, an initial parameter corresponding to the second image obtained in the a first dual frame mode manner of the plurality of dual frame mode manners.

17. The electronic device according to claim 14, wherein the electronic device supports a first HDR video mode, wherein the first HDR video mode comprises an HDR10 standard or an HDR10 plus (HDR10+) standard.

18. A non-transitory computer-readable storage medium, wherein the non-transitory computer-readable storage medium stores computer-executable program instructions, and when the computer-executable program instructions are run on a computer, the computer is enabled to:
receive a first operation input by a user, wherein the first operation is used to enable a video recording function of an electronic device;
obtain a first image in a preset default high-dynamic range (HDR) exposure manner in response to the first operation;
obtain ambient brightness based on the first image, and determining a first target HDR exposure manner based on a preset policy, wherein the preset policy comprises a plurality of target HDR exposure manners corresponding to a plurality of scenarios, the plurality of scenarios comprise dynamic range information corresponding to video shooting, a flicker status, and at least one correspondence between ambient brightness information and at least one target HDR exposure manner, and the plurality of target HDR exposure manners comprises at least one single frame mode manner and a plurality of dual frame mode manners, the at least one single frame mode manner comprises a binning mode manner, the plurality of dual frame mode manners comprises a stagger high-dynamic range (SHDR) mode manner and a DXG mode manner, and wherein the DXG mode manner is a mode manner in which a dual conversion gain (DCG) mode manner and a dual analog gain (DAG) mode manner are used in superposition; and
when the first target HDR exposure manner is different from the default HDR exposure manner, switch the default HDR exposure manner to the first target HDR exposure manner, and continuing to perform the video shooting to obtain a second image.

19. The non-transitory computer-readable storage medium according to claim 18, wherein the electronic device is further enabled to perform:
fusing images in a first dual frame mode manner of the plurality of dual frame mode manners when the target HDR exposure manner is the first dual frame mode manner of the plurality of dual frame mode manners.

20. The non-transitory computer-readable storage medium according to claim 19, wherein when the computer-executable program instructions are run on the computer, the computer is further enabled to:
preset a target parameter corresponding to an image obtained through the video shooting; and
adjust, to the target parameter, an initial parameter corresponding to the first image obtained in the at least one single frame mode manner; and/or
adjust, to the target parameter, an initial parameter corresponding to the second image obtained in the a first dual frame mode manner of the plurality of dual frame mode manners.

* * * * *